United States Patent [19]
Akiyama et al.

[11] Patent Number: 5,521,733
[45] Date of Patent: May 28, 1996

[54] OPTICAL SWITCHING DEVICE FOR WAVELENGTH-MULTIPLEXING OPTICAL COMMUNICATION

[75] Inventors: Minoru Akiyama, 1-6-6, Tokiwa-daira, Matsudo-shi, Chiba 270; Jun-ichi Mizusawa, Itabashi-nakadai-mantion 3-25-1, Nakadai, Itabashi-ku, Tokyo 174; Tsutomu Watanabe; Hossain M. Akram, both of Chiba, all of Japan

[73] Assignees: Fujikura Ltd; Minoru Akiyama; Jun-ichi Mizusawa, all of Tokyo, Japan

[21] Appl. No.: 136,850

[22] Filed: Oct. 18, 1993

[30] Foreign Application Priority Data

Apr. 9, 1993 [JP] Japan ................... 5-107670

[51] Int. Cl.$^6$ ................... H04J 14/02
[52] U.S. Cl. ................... 359/127; 359/128
[58] Field of Search ................... 359/127, 128, 359/130, 131, 634, 124

[56] References Cited

U.S. PATENT DOCUMENTS

| | | | |
|---|---|---|---|
| 3,547,521 | 12/1970 | Ichizuka | 359/634 |
| 3,953,727 | 4/1976 | d'Auria | 359/127 |
| 4,707,064 | 11/1987 | Dobrowolski | 359/127 |
| 5,165,079 | 11/1992 | Schulz-Hennig | 359/634 |

FOREIGN PATENT DOCUMENTS

| | | | |
|---|---|---|---|
| 0158247 | 12/1977 | Japan | 359/127 |
| 0876944 | 5/1982 | Japan | 359/127 |

OTHER PUBLICATIONS

Spencer, "State of the Art Survey of Multimade FiberOptic WDM", Optical Fibers In Broadband Networks, Instrumentation And Urban And Industrial Environments, May 16–19, 1983 pp. 117–131.
"Photonic Switching System", IEICE Transactions, vol. E74, No. 1, Jan. 1991.
"Thin-Film Optical Fibers", H. A. Macleod, 2nd Ed.
DeLange, "Wide Band Optical Communication Systems: Part II Frequency Division Multiplexing", Proc. of IEEE, vol. 58, #10 pp. 1683–1690, Oct. 1970.

Primary Examiner—Leslie Pascal
Attorney, Agent, or Firm—Lowe, Price, LeBlanc & Becker

[57] ABSTRACT

An optical switching device for dividing an optical input which was wavelength-multiplexed into a plurality of optical outputs by wavelengths is disclosed. The device comprises a first filtering circuit and a second filtering circuit. The first filtering circuit has a plurality of interference filters disposed in line on an optical path of the optical input. The interference filters have different edge wavelengths each other so as to reflect a component with a predetermined wavelength of the optical input and to transmit the remaining components of the optical input. The second filtering circuit has a plurality of interference filters disposed on respective optical paths of reflected rays of the first filtering circuit. The interference filters of the second filtering circuit have different edge wavelengths each other so as to remove components with unnecessary wavelengths from the reflected ray and extract optical outputs.

12 Claims, 17 Drawing Sheets

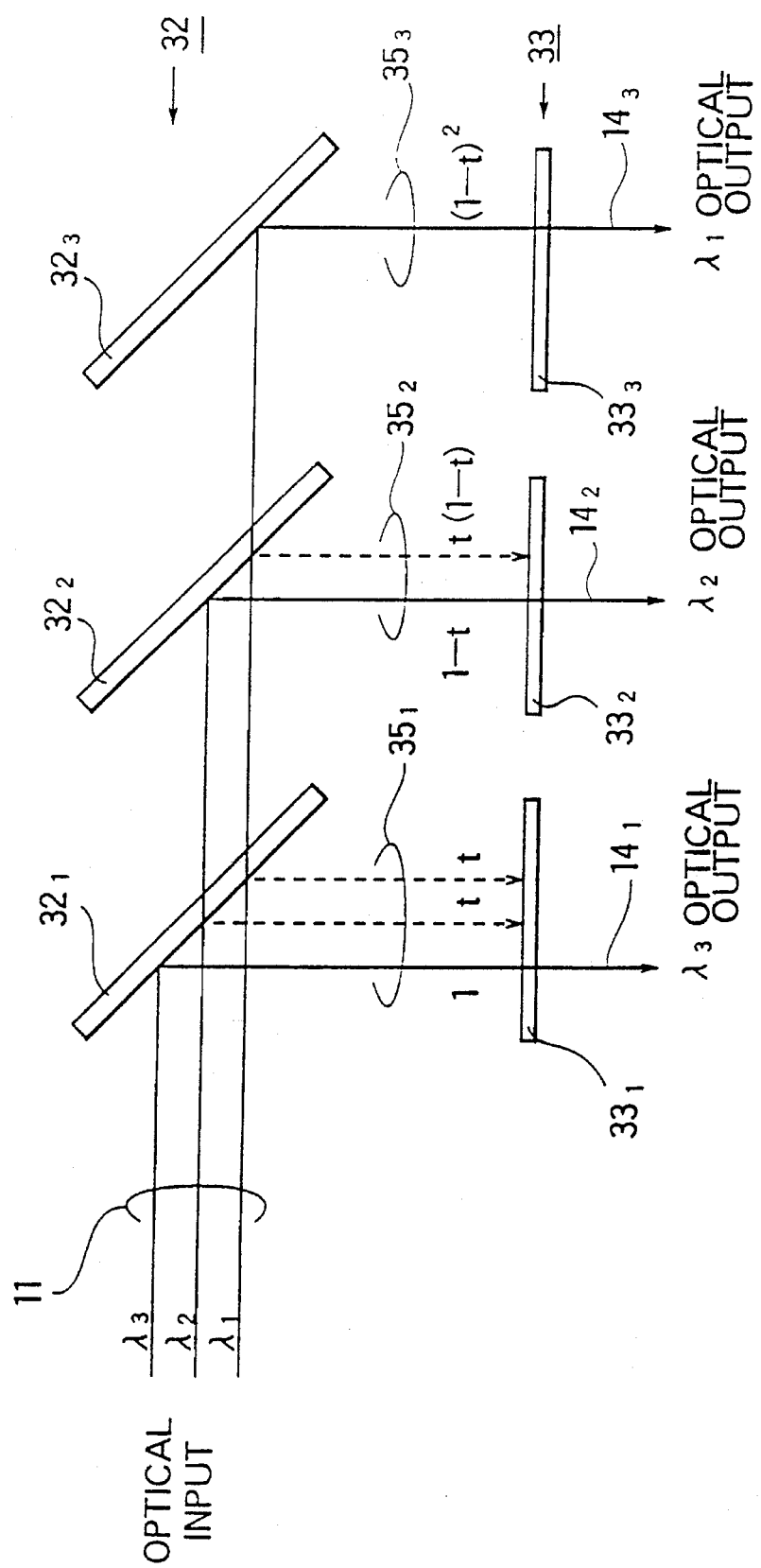

OPTICAL SWITCHING DEVICE FOR WAVELENGTH-MULTIPLEXING OPTICAL COMMUNICATION

BACKGROUND OF THE INVENTION

The present invention relates to an optical switching device for providing a signal switching function for use in a wavelength-multiplexing optical communication, in particular, to an optical switching device for use in, for example, an optical communication path for a LAN, an optical bus for a computer system, a connection bus for various electronic units, and an in-rack optical signal wiring.

In most conventional optical communication systems, wavelengths of 1.3 μm-band or 1.5 μm-band have been used. In recent years, however, to construct large capacity optical communication systems using wavelength-multiplexing, a technique for inserting a large number of wavelengths of signals at intervals of several nano-meters based on such two bands is being studied. When this technique is established, an optical communication system with a very narrow band can have a large capacity. The communication switching technique which deals with such a narrow band is, however, just in an initial stage of study. Thus far, such a technique has not been accomplished.

To accomplish a switching function of such a wavelength-multiplexing optical communication system, a technique for mixing and dividing a large number of optical signals with different wavelengths is essentially required. With conventional optical filters, it is difficult to satisfactorily obtain desired signal levels and S/N ratios. In particular, when a large number of signals with different wavelengths in a narrow band are used, S/N ratios of the signals are remarkably degraded. With a number of filters connected, the S/N ratios may be improved. However, the signal levels are remarkably lowered due to signal losses. Thus, with the conventional technique, a desired switching function cannot be accomplished.

To accomplish such a switching function, a semiconductor device named a tunable filter which filters a signal on the order of several nm is being developed. However, it will take a long time to complete such a device. In addition, since such an active device requires synchronization of wavelengths, thereby confronting large technical difficulties (as in Minoru AKIYAMA et. al. "Photonic Switching System" IEICE Transactions VOL E74, No. 1, January 1991).

SUMMARY OF THE INVENTION

An object of the present invention is to provide an optical switching device for wavelength-multiplexing optical communication which is compactly constructed of passive devices, minimizes the decrease of signal levels, and divides wavelength-multiplexed signals into original signals with high S/N ratios.

A first aspect of the present invention is an optical switching device for dividing an optical input which was wavelength-multiplexed into a plurality of optical outputs corresponding to components with different wavelengths, the device comprising (a) a first filtering circuit having a plurality of interference filters disposed in line on an optical path of the optical input, the interference filters having different edge wavelengths each other so as to reflect components with predetermined wavelength regions and to transmit the remaining components, and (b) a second filtering circuit having a plurality of interference filters disposed on respective optical paths of reflected rays of the first filtering circuit, the interference filters having different edge wavelengths each other so as to remove components with unnecessary wavelengths from the reflected rays and to extract optical outputs.

A second aspect of the present invention is an optical switching device for dividing an optical input which was wavelength-multiplexed into a plurality of optical outputs corresponding to components with different wavelengths, the device comprising (a) a first filtering circuit having a plurality of interference filters disposed in the direction cross with an optical path of an optical input so that one of the interference filters receives the optical input, the interference filters having different edge wavelengths each other so as to reflect components with predetermined wavelength regions of the optical input and to transmit the remaining components thereof, (b) a reflection plate disposed on optical paths of reflected rays of the first filtering circuit so as to enter the reflected ray of each of the interference filters of the first filtering circuit to the subsequent interference filter, and (c) a second filtering circuit having a plurality of interference filters disposed on respective optical paths of transmitted rays of the first filtering circuit, the interference filters having different edge wavelengths each other so as to remove components with unnecessary wavelengths from the transmitted rays and to extract optical outputs.

In the present invention, two types of interference filters are used in combination. The first interference filter reflects components with wavelengths which are shorter than or equal to a predetermined edge wavelength and transmits the other components with wavelengths longer than the edge wavelength. Hereinafter, the first interference filter is referred to as a long-wavelength pass filter (LWPF). The second interference filter transmits components with wavelengths shorter than or equal to a predetermined edge wavelength and reflects the other components with wavelengths longer than the edge wavelength. The second interference filter is referred to as a short-wavelength pass filter (SWPF).

The basic characteristics and edge wavelengths of these LWPF and SWPF can be determined by selecting the materials, thicknesses, and numbers of layers of a multilayer dielectric film. These filters have almost 100% of reflectance in their reflection regions. These filters have, however, their transmittance of slightly lower than 100% in their transmission regions. These filters have their edges which are sharp transition regions on their wavelength versus transmittance curves. However, these edge regions have particular widths of wavelengths. In this description, with respect to these filters, a point of 50% of transmittance is defined as an edge wavelength. This definition is only for reference use. Thus, another point of the transition region where the transmission mode and the reflection mode of each filter is changed may be referred to as an edge wavelength.

In the first aspect of the present invention, as a first filtering circuit, for example, a plurality of LWPFs disposed in line on an optical path of an optical input are used. The first stage LWPF has an edge wavelength with which the shortest wavelength component in the optical input is totally reflected. The second stage LWPF has an edge wavelength with which the next shortest wavelength component in the transmitted ray of the first stage LWPF is totally reflected. Likewise, the more the stage number of LWPF increases (namely, the more it is apart from an optical input terminal), the more the edge wavelength shifts to longer wavelength side.

On optical paths of reflected rays of the LWPFs of the first filtering circuit, SWPFs are disposed which construct a second filtering circuit. Practically, the edge wavelength of each LWPF of the first filtering circuit is the same as that of the corresponding SWPF of the second filtering circuit. In other words, the characteristic of each SWPF of the second filtering circuit processing the reflected light of the first filtering circuit is the reverse of that of each LWPF of the first filtering circuit. By a combination of the LWPFs and SWPFs, divided optical outputs with necessary wavelengths are extracted with high S/N ratios from the SWPFs of the second filtering circuit.

It should be noted that the first filtering circuit may be constructed of a plurality of SWPFs and that the second filtering circuit may be constructed of a plurality of LWPFs. In this case, the more the SWPFs of the first filtering circuit are apart from the input terminal, the more the edge wavelength thereof shift on shorter wavelength side. In contrast, the more the LWPFs of the second filtering circuit are apart from the input terminal, the more the edge wavelengths thereof shift on shorter wavelength side. The edge wavelength of each LWPF in the first filtering circuit is preferably the same as the edge wavelength of the corresponding SWPF in the second circuit. Therefore, the characteristics of each SWPF in the first filtering circuit are the reverse of the characteristics of the corresponding LWPF in the second filtering circuit.

In the second aspect of the present invention, as a first filtering circuit, a plurality of SWPFs which are, for example, disposed in the direction cross with the optical path of the optical input are used. The first stage SWPF which directly receives the optical input has an edge wavelength with which a component with the shortest wavelength is transmitted. The reflected ray of the first stage SWPF is perfectly reflected by a reflection plate. This reflected ray enters the second stage SWPF. The second stage SWPF has an edge wavelength (which is longer than that of the first stage SWPF) with which the next shortest wavelength component is transmitted. Likewise, the more each SWPF of the first filtering circuit is apart from the input terminal, the more the edge wavelength thereof shifts on the longer wavelength side. Each reflection substance is disposed so that reflected light of an SWPF is entered into the subsequent SWPF. As a second filtering circuit which reflects and removes components with unnecessary shorter wavelengths from the rays which pass through the first filtering circuit, a plurality of LWPFs are used. By a combination of such SWPFs and LWPFs, signals with necessary wavelengths can be extracted with high S/N ratios.

In the second aspect of the present invention, as with the first aspect, the first filtering circuit may be constructed of a plurality of LWPFs and the second filtering circuit may be constructed of a plurality of SWPFs.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

FIG. 9 is a schematic diagram showing the construction of an optical switching device according to a second embodiment of the present invention;

The accompanying drawings, which are incorporated in and construct a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
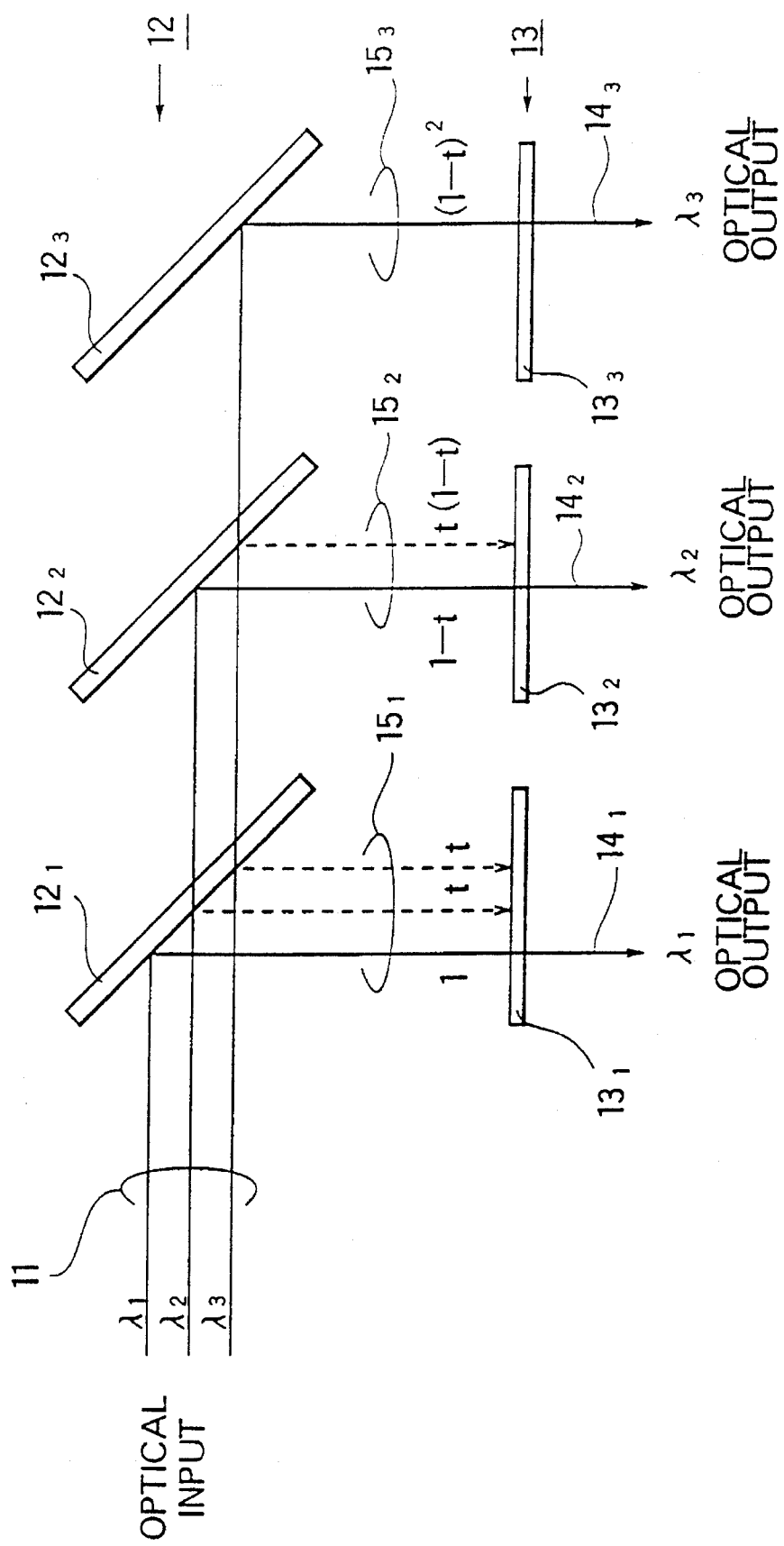
FIG. 1 is a schematic diagram showing the construction of an optical switching apparatus according to a first embodiment of the present invention.

FIG. 1 is a schematic diagram showing the construction of an optical switching apparatus according to an embodiment (first embodiment) of the present invention. This optical switching apparatus is a kind of a wavelength-division switching device.

Figure 2:
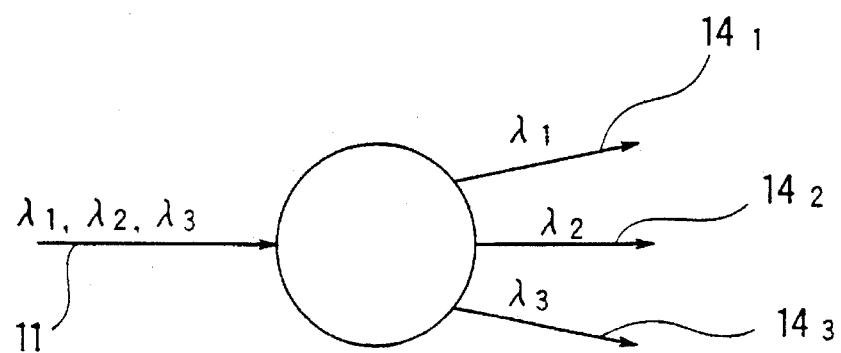
FIG. 2 is a schematic diagram showing the conception of the optical switching apparatus of the first embodiment.

FIG. 2 is a schematic diagram showing the conception of the optical switching apparatus of the first embodiment. An optical input 11, in this example, is a signal where components with three wavelengths λ1, λ2, and λ3 were multiplexed. As shown in FIG. 2, a wavelength-division switching apparatus divides the optical input 11 into components with wavelengths λ1, λ2, and λ3 and extracts respective optical outputs $14_1$, $14_2$, and $14_3$. Examples of wavelengths of the optical outputs are λ1=650 nm, λ2=780 nm, and λ3=840 nm. The optical input 11 is transmitted on one optical path, for example, with one fiber (not shown). In FIG. 1, for the sake of easy understanding, individual optical paths corresponding to components with different wavelengths are shown.

As shown in FIG. 1, on the optical path of the optical input 11, three long-wavelength pass filters (LWPFs) $12_1$, $12_2$, and $12_3$ are disposed in line with angles of 45° against the optical path. These LWPFs $12_1$, $12_2$, and $12_3$ construct a first filtering circuit 12. Reflected rays $15_1$, $15_2$, and $15_3$ of the first filtering circuit 12 enter SWPFs $13_1$, $13_2$, and $13_3$. The short-wavelength pass filters (SWPFs) $13_1$, $13_2$, and $13_3$ extract optical outputs $14_1$, $14_2$, and $14_3$ with respective wavelengths. The SWPFs $13_1$, $13_2$, and $13_3$ construct a second filtering circuit 13.

The LWPFs $12_1$, $12_2$, and $12_3$, which construct the first filtering circuit 12, and the SWPFs $13_1$, $13_2$, and $13_3$, which construct the second filtering circuit 13, are interference filters made of multilayer dielectric films.

Figure 3:
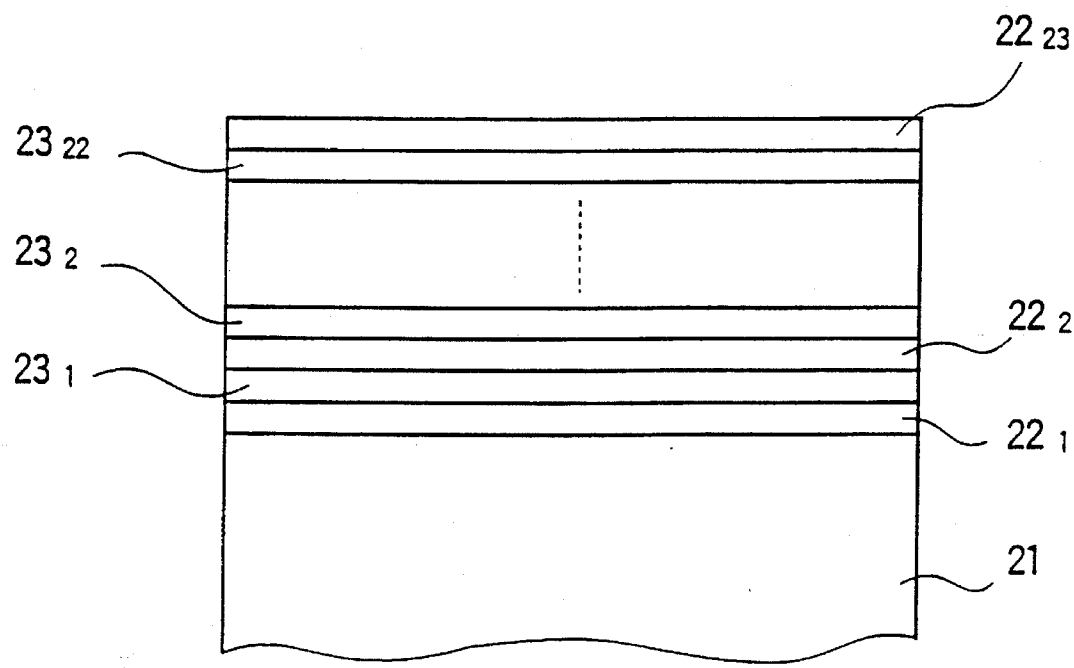
FIG. 3 is a schematic diagram showing the construction of an interference filter of the first embodiment.

FIG. 3 is a schematic diagram showing an example of the construction of the interference filters. As shown in the figure, the interference filter is produced by repeatedly evaporating a $SiO_2$ film 22 and a $TiO_2$ film 23 on a glass substrate 21 one after the other. The refractive index of the $SiO_2$ film 22 is different from that of the $TiO_2$ film 23. Namely, the refractive index of the $SiO_2$ film 22 is 1.5, whereas the refractive index of the $TiO_2$ film is 2.3. The glass substrate 21 is for example a quartz glass with a refractive index of 1.5. The thicknesses of $SiO_2$ film 22 and $TiO_2$ film 23 are several nano-meters. The interference filter is made of a multilayer film consisting of a total of for example 45 layers.

The interference filters are designed and produced by using computer simulations. By controlling the thickness of each layer of the $SiO_2$ film 22 and the $TiO_2$ film 23 and the number of layers thereof based on the results of the computer simulations, LWPFs and SWPFs with any edge wavelengths can be produced. In addition, by precisely controlling the thickness of each layer of the $SiO_2$ film 22 and the $TiO_2$ film 23 and the number of layers thereof, both of the LWPFs and SWPFs have around 100% of reflection factor in their reflection regions and around 90% of transmission factor in their transmission regions. The theory of designing these interference filters is described in for example "Thin-Film Optical Fibers", by H. A. Macleod, (2nd. Ed.)

Figure 4:
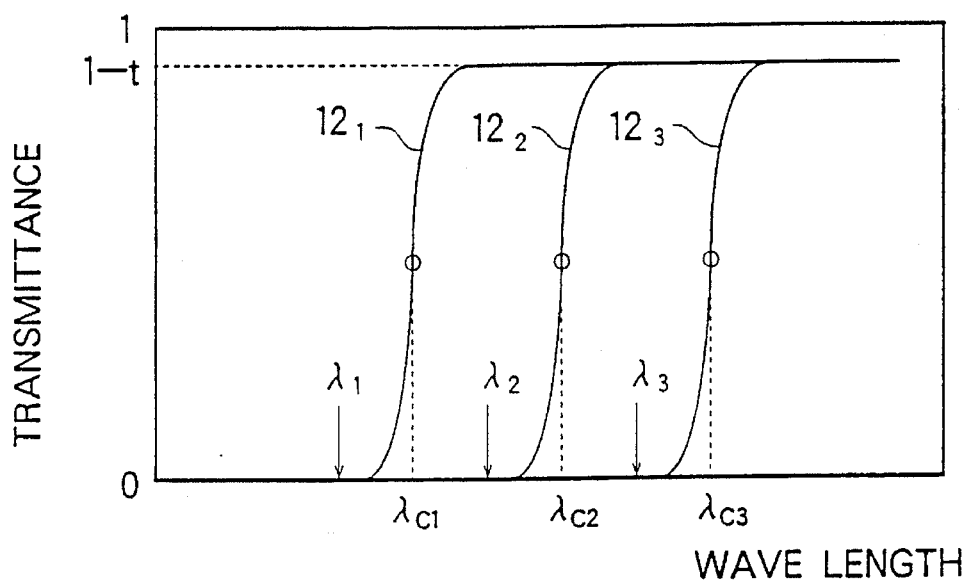
FIG. 4 is a graph showing characteristics of a first filtering circuit of the first embodiment.

FIG. 4 is a graph showing transmission characteristics of LWPFs $12_1$, $12_2$, and $12_3$, which construct the first filtering circuit 12. As shown in the figure, with respect to edge wavelengths λc1, λc2, and λc3 of LWPFs $12_1$, $12_2$, and $12_3$ and wavelengths λ1, λ2, and λ3 of the wavelength-multiplexed signal, the following relation is satisfied.

$$\lambda 1 < \lambda c1 < \lambda 2 < \lambda c2 < \lambda 3 < \lambda c3$$

In other words, the more each filter is apart from the optical input terminal (in the order of the first stage LWPF $12_1$, the second stage LWPF $12_2$, the third stage LWPF $12_3$, and so forth), the more the edge wavelength thereof increases. Although each LWPF totally reflects an entered ray in its reflection region, it does not totally transmit the ray in its transmission region. When the quantity of light totally entered is 1, the quantity of light transmitted and the quantity of light reflected are given by (1-t) and t, respectively (where t=0.1 to 0.2).

Figure 5:
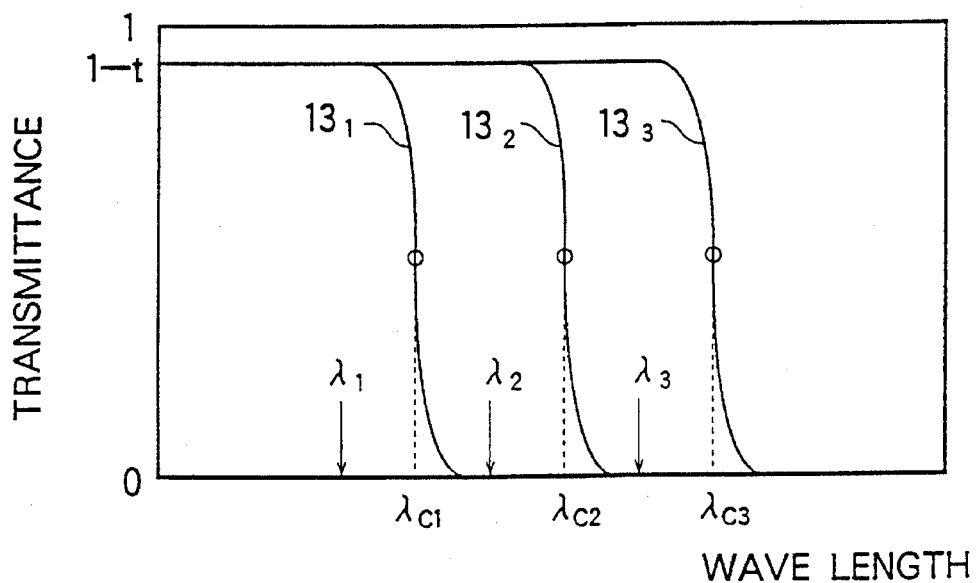
FIG. 5 is a graph showing characteristics of a second filtering circuit of the first embodiment.

FIG. 5 is a graph showing transmission characteristics of SWPFs $13_1$, $13_2$, and $13_3$, which construct the second filtering circuit 13. When compared with FIG. 4, it is clearly found that although the edge wavelengths of the SWPFs $13_1$, $13_2$, and $13_3$ are the same as those of the LWPFs $12_1$, $12_2$, and $12_3$, the characteristics of the former are the reverse of those of the latter.

In such a construction, the optical input 11 which was wavelength-multiplexed can be divided into components with different wavelengths with high S/N ratios. Next, with reference to FIGS. 6 to 8, the wavelength-division of the optical input 11 will be described.

Figure 6A:
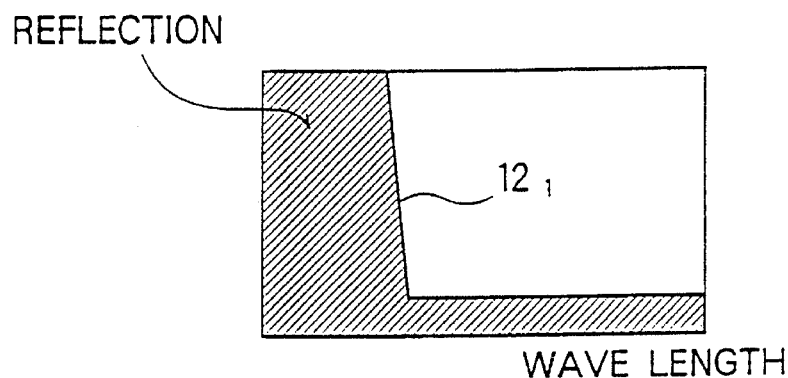
FIGS. 6A to 6C are graphs for explaining a wavelength dividing operation of the first embodiment.
Figure 6B:
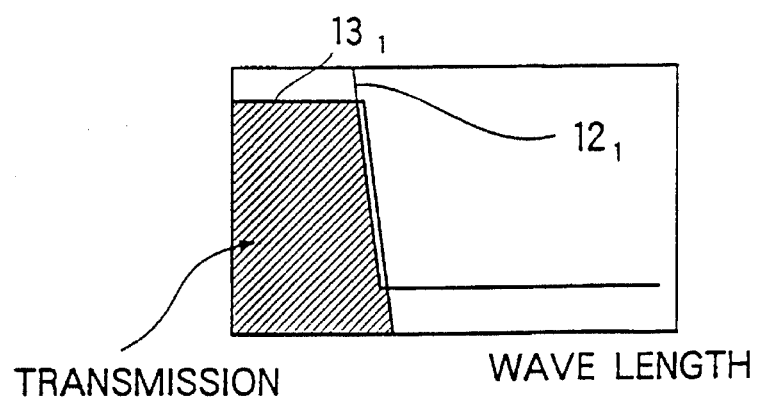
Figure 6C:
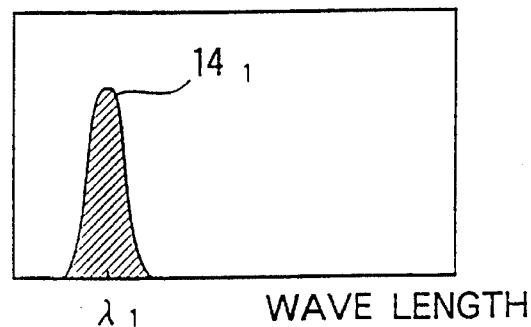

FIGS. 6A to 6C are graphs for explaining how a signal component with a wavelength λt is extracted from the reflected ray of the LWPF $12_1$ and the transmitted ray of the SWPF $13_1$. As shown by hatched lines of FIG. 6A, the LWPF $12_1$ totally reflects components with edge wavelengths λc1 or shorter. In a region of wavelengths longer than λc1, the LWPF $12_1$ reflects a small part of ray entered (which is denoted by t) and transmits the remaining ray (which is denoted by 1-t). As shown by hatched lines of FIG. 6B, the SWPF $13_1$ of the second filtering circuit 13 transmits components with edge wavelengths λc1 or shorter. In a region of wavelengths longer than λc1, the SWPF $13_1$ totally reflects components and removes them as noises. Thus, as shown in FIG. 6C, an optical output $14_1$ with the wavelength λ1 is obtained.

Figure 7A:
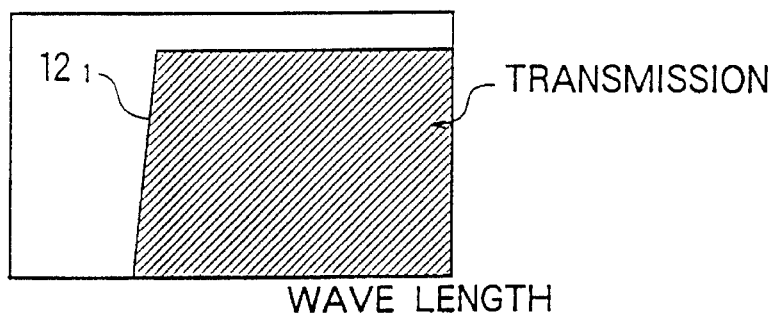
FIGS. 7A to 7D are graphs for explaining the wavelength dividing operation of the first embodiment.
Figure 7B:
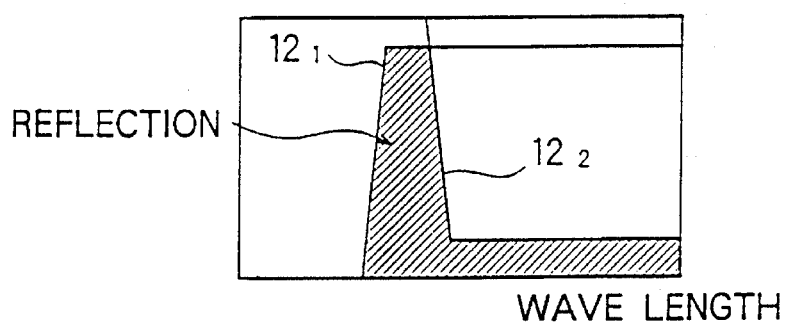
Figure 7C:
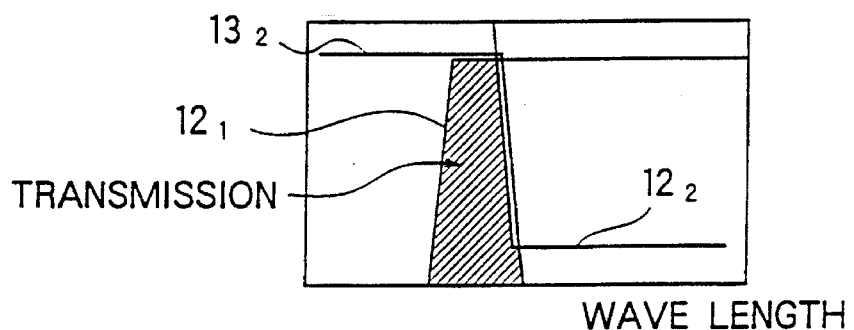
Figure 7D:
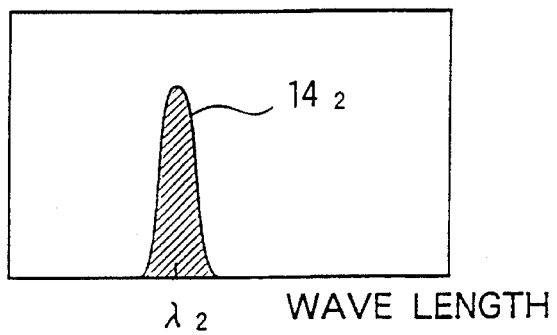

FIGS. 7A to 7D are graphs for explaining how an optical output $14_2$ with a wavelength λ2 where noises were removed (a hatched portion of FIG. 7D) is obtained by a combination of the LWPFs $12_1$,$12_2$ and the SWPF $13_2$. A hatched portion of FIG. 7A is a transmission region of the LWPF $12_1$. A hatched portion of FIG. 7B is a overlapped region of the transmission region of the LWPF $12_1$ and the reflection region of the LWPF $12_2$. A hatched region of FIG. 7C is a overlapped region of the transmission region of the LWPF $12_1$, the reflection region of the LWPF $12_2$ and the transmission region of the SWPF $13_2$.

Figure 8A:
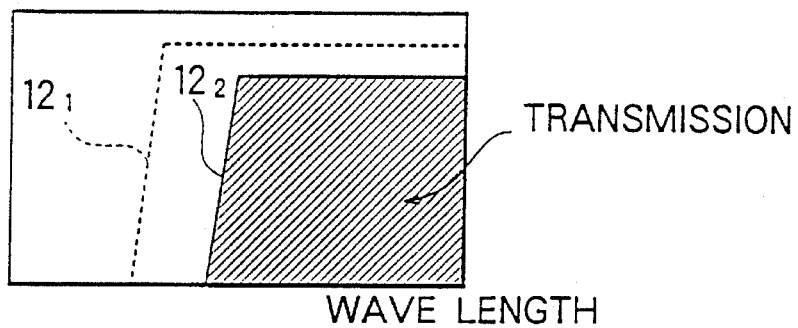
FIGS. 8A to 8D are graphs for explaining the wavelength dividing operation of the first embodiment.
Figure 8B:
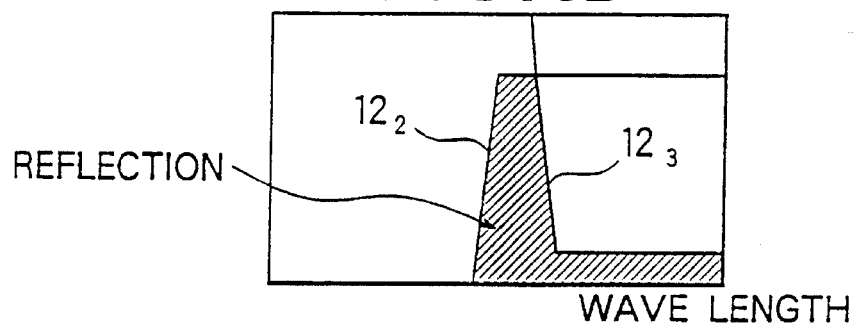
Figure 8C:
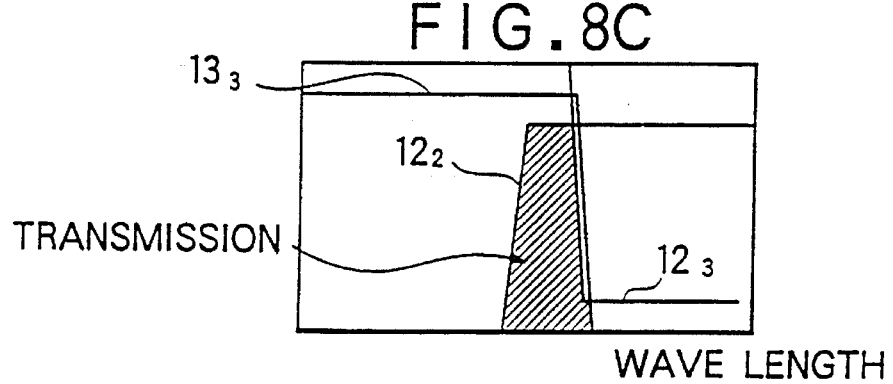
Figure 8D:
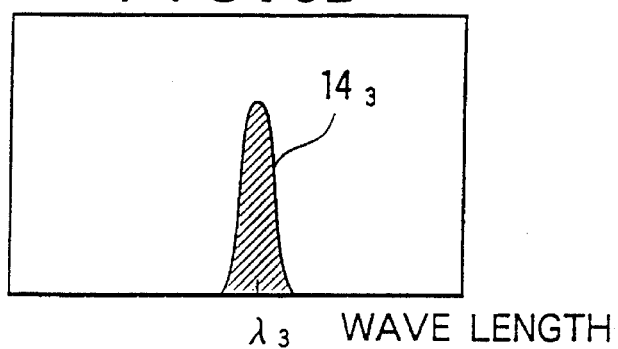

FIGS. 8A to 8D are graphs for explaining how an optical output $14_3$ with a wavelength λ3 where noises were removed (a hatched portion of FIG. 8D) is obtained by a combination of the LWPFS $12_1$,$12_2$ and $12_3$ and the SWPF $13_3$. A hatched portion of FIG. 8A is a common transmission region of the LWPF $12_1$ and $12_2$. A hatched portion of FIG. 8B is a overlapped region of the common transmission region of the LWPF $12_1$ and $12_2$ and the reflection region of the LWPF $12_3$. A hatched region of FIG. 8C is a overlapped region of the transmission region of the LWPF $12_1$ $12_2$, the reflection region of the LWPF $12_3$ and the transmission region of the SWPF $13_3$.

As described above, according to this embodiment, by a combination of a plurality of LWPFs and a plurality of SWPFs, band pass filters corresponding to wavelength components of an optical input can be constructed. According to the above-described embodiment, with low losses of interference filters, an optical signal which was wavelength-multiplexed is divided with high S/N. In addition, by a simple combination of passive devices only, a wavelength-division switching apparatus can be compactly constructed.

Figure 10:
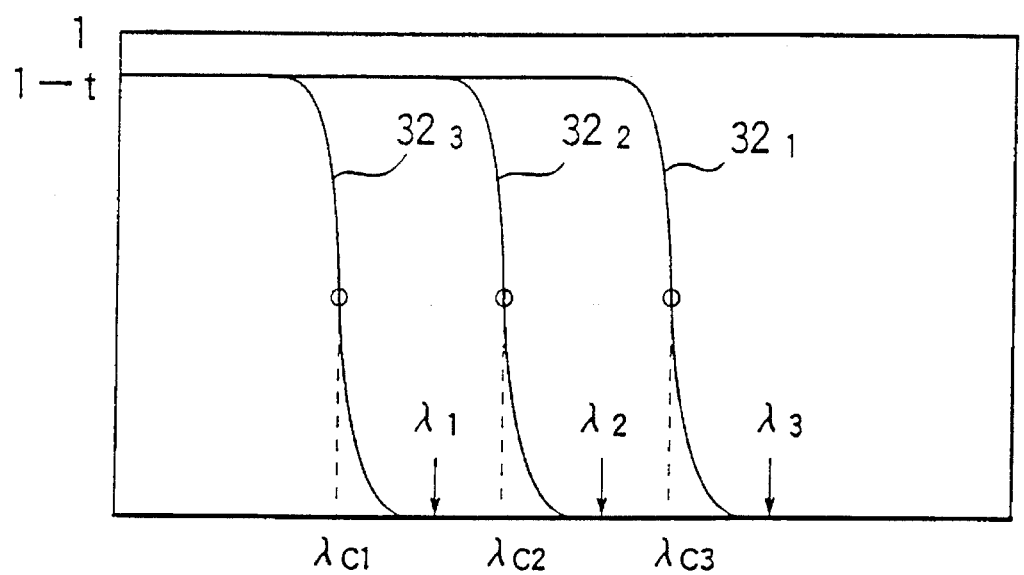
FIG. 10 is a graph showing characteristics of a first filtering circuit of the second embodiment.
Figure 11:
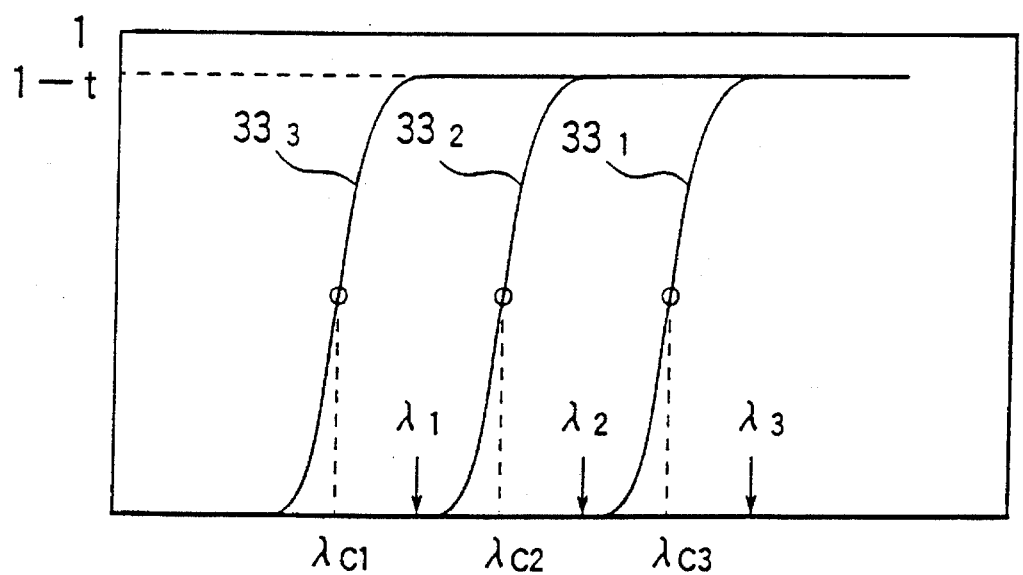
FIG. 11 is a graph showing characteristics of a second filtering circuit of the second embodiment.

FIG. 9 is a schematic diagram showing an optical switching apparatus according to a second embodiment of the present invention. In contrast to the first embodiment shown in FIG. 1, first filtering circuit 32 is constructed of SWPFs $32_1$, $32_2$, and $32_3$, and second filtering circuit 33 which removes noises is constructed of LWPFS $33_1$, $33_2$, and $33_3$. As shown in FIG. 10, as the transmission characteristics of the SWPFs $32_1$, $32_2$, and $32_3$, which construct the first filtering circuit 32, the more each SWPF is apart from an input terminal, the more the edge wavelength thereof shifts on shorter wavelength side. Likewise, as shown in FIG. 11, as the transmission characteristics of the LWPFs $33_1$, $33_2$, and $33_3$, which construct the second filtering circuit 33, the more each LWPF is apart from the input terminal, the more the edge wavelength thereof shifts on the shorter wavelength side. The edge wavelengths of both the SWPF $32_1$ and the corresponding LWPF $33_1$ are set to $\lambda c3$. The edge wavelengths of both the SWPF $32_2$ and the corresponding LWPF $33_2$ are set to $\lambda c2$. The edge wavelengths of both the SWPF $32_3$ and the corresponding LWPF $33_3$ are set to $\lambda c1$.

In this construction, the component with the wavelength $\lambda 3$ of the optical input 11 is almost totally reflected by the first stage SWPF $32_1$. The other components with unnecessary wavelengths contained in a reflected ray $35_1$ are removed by the LWPF $33_1$. Thus, the optical output $14_1$ with the wavelength $\lambda 3$ is obtained. The component with the wavelength $\lambda 2$ which is contained in a transmission ray of the first stage SWPF $32_1$ is almost totally reflected by the second stage SWPF $32_2$. The other components with unnecessary wavelengths contained in a reflected ray $35_2$ are removed by the LWPF $33_2$. Thus, the optical output $14_2$ with the wavelength $\lambda 2$ is obtained. The component with the wavelength $\lambda 1$ which is contained in a transmission ray of the SWPFs $32_1$ and $32_2$ are almost totally reflected by the third stage SWPF $32_3$. The other components with unnecessary wavelengths contained in a reflected ray $35_3$ are removed by the LWPF $33_3$. Thus, the optical output with the wavelength $\lambda 1$ is obtained.

In the second embodiment, the same effects as the above-described first embodiment can be obtained.

In the respective apparatuses according to the above-described embodiments, a plurality of interference filters which construct a first filtering circuit are disposed in line on the optical path of the optical input 11. The farther an optical signal flows apart from the input terminal, the more filters it passes through, thereby lowering the level thereof. Thus, when the number of wavelengths which were multiplexed increases, the decrease of the levels of the optical outputs cannot be ignored.

Figure 12:
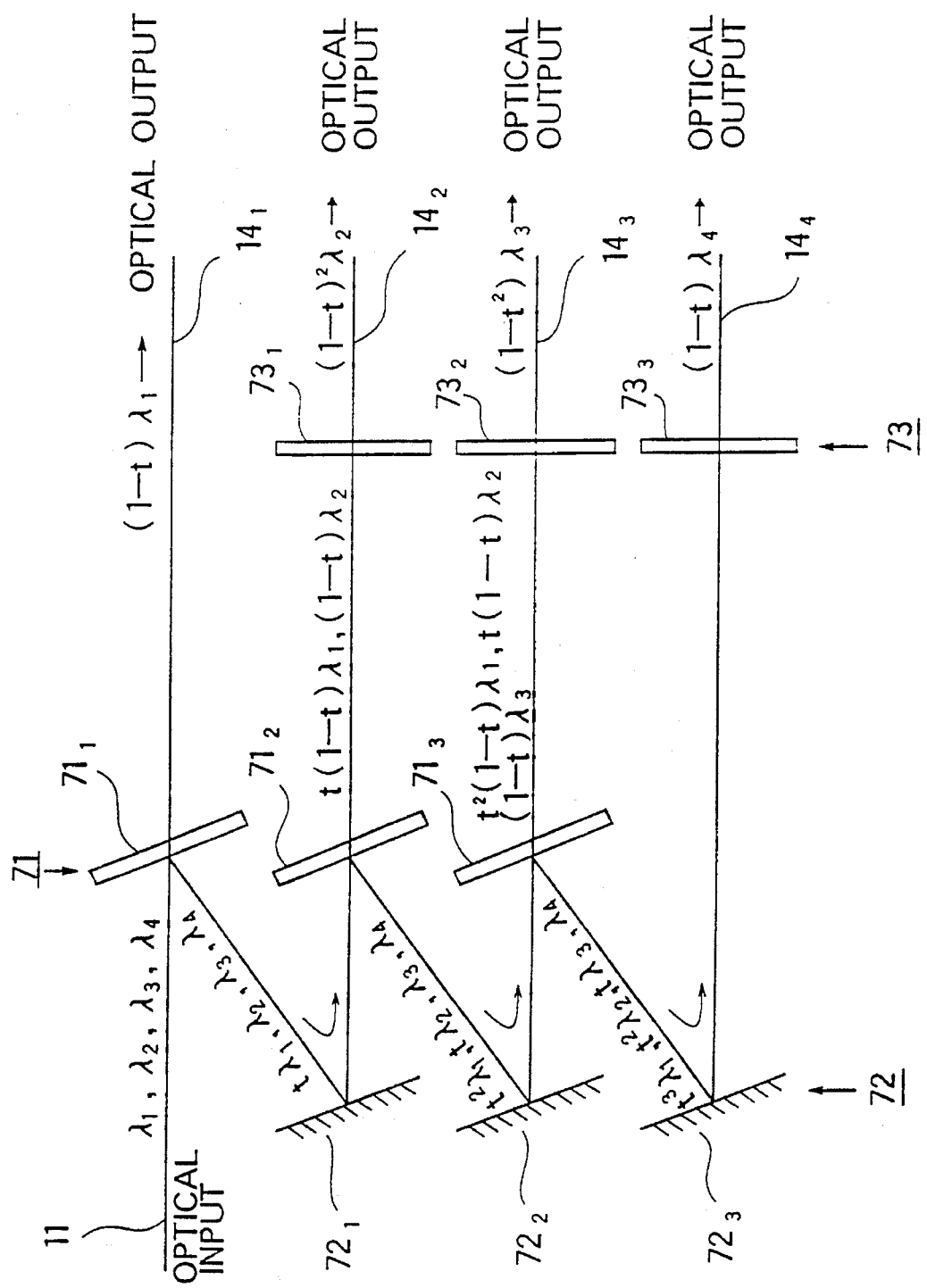
FIG. 12 is a schematic diagram showing the construction of an optical switching apparatus according to a third embodiment of the present invention.
Figure 13:
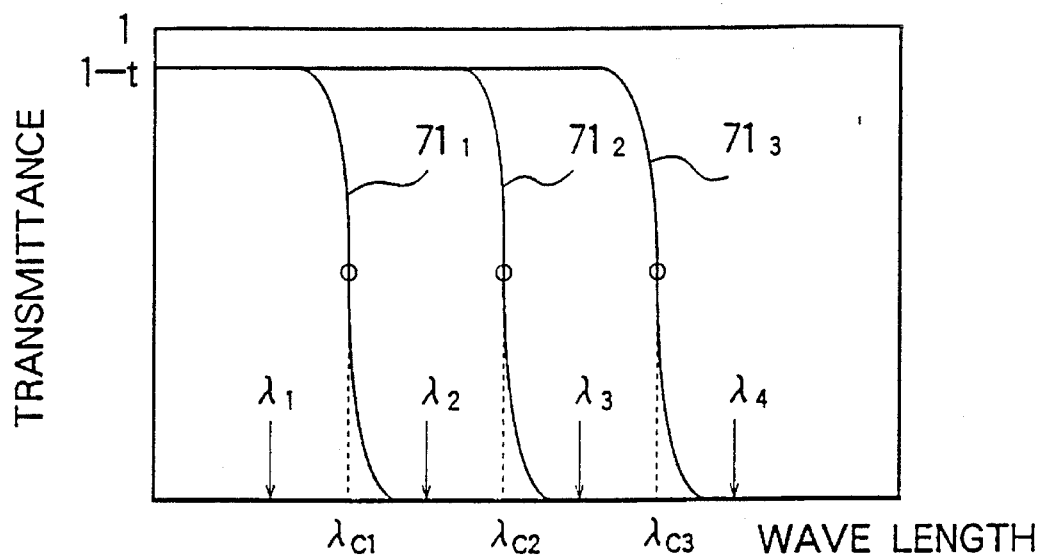
FIG. 13 is a graph showing characteristics of a first filtering circuit of the third embodiment.

FIG. 12 shows the construction of an optical switching apparatus which can solve such a problem. Hereinafter, this optical switching apparatus is referred to as a third embodiment of the present invention. In the third embodiment shown in FIG. 12, an optical input 11 is a signal where different wavelengths $\lambda 1$, $\lambda 2$, $\lambda 3$, and $\lambda 4$ were multiplexed. A first filtering circuit 71 is constructed of three SWPFs $71_1$, $71_2$, and $71_3$. The SWPF $71_1$, $71_2$, and $71_3$ are disposed in the direction cross with the optical path of the optical input 11 with a common angle leaned to the optical path. The optical input 11 directly enters the first stage SWPF $71_1$. As shown in FIG. 13, respective edge wavelengths $\lambda c1$, $\lambda c2$, and $\lambda c3$ of the three SWPFs $71_1$, $71_2$, and $71_3$ have the relation of $\lambda c1 < \lambda c2 < \lambda c3$. In other words, the more each filter is apart from the optical input terminal, the more the edge wavelength thereof increases. The relation between the edge wavelengths and the wavelengths of multiplexed signal in this embodiment is the same as that of the first embodiment shown in FIG. 1.

The three reflection plates 72 ($72_1$, $72_2$, and $72_3$) are disposed in parallel with the first filtering circuit 71. The reflection plate $72_1$ reflects a reflected ray of the first stage SWPF $71_1$ to the second stage SWPF $71_2$. The reflection plate $72_2$ reflects a reflected ray of the second stage SWPF $71_2$ to the third stage SWPF $71_3$. Likewise, the reflection plate $72_n$ reflects a reflected ray of the n-th stage SWPF $71_n$ to the (n+1)-th stage SWPF $71_{n+1}$.

Figure 14:
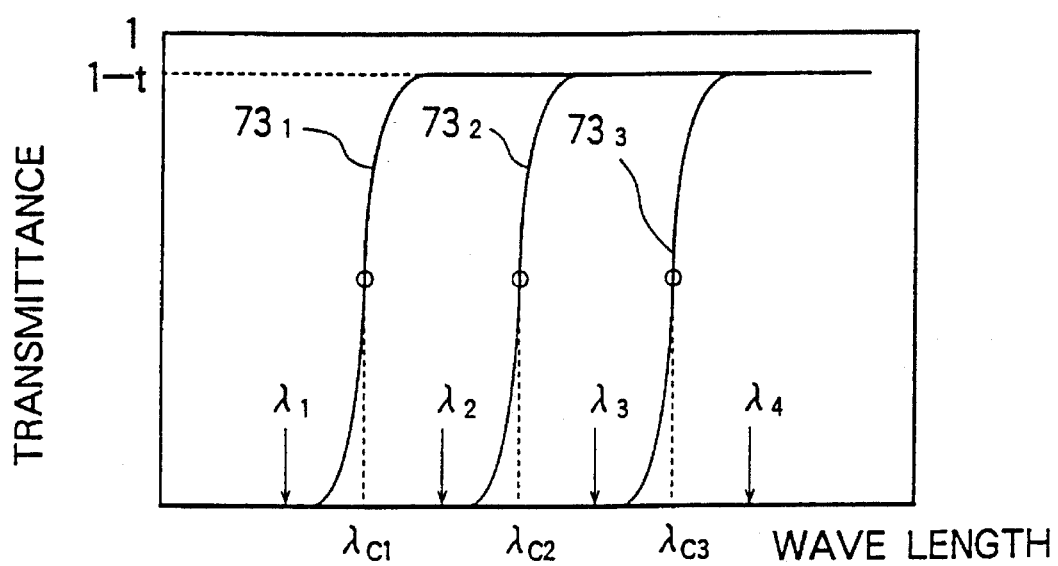
FIG. 14 is a graph showing characteristics of a second filtering circuit of the third embodiment.

Behind the first filtering circuit 71, a second filtering circuit 73 is disposed. In this embodiment, the second filtering circuit 73 is constructed of three LWPFs $73_1$, $73_2$, and $73_3$. In this embodiment, a transmitted ray of the first stage SWPF $71_1$ of the first filtering circuit 71 is extracted as a direct optical output $14_1$. Thus, behind the first stage SWPF $71_1$, no LWPF is disposed. Behind the second SWPF $71_2$ of the first filtering circuit 71, the LWPF $73_1$ is disposed. Behind the third SWPF $71_3$ of the first filtering circuit 71, the LWPF $73_2$ is disposed. A reflected ray of the third stage SWPF $71_3$ of the first filtering circuit 71 is reflected by the reflection plate $72_3$. Thereafter, this reflected ray enters the LWPF $73_3$, not passes through an SWPF. As shown in FIG. 14, the edge wavelengths of the three LWPFs $73_1$, $73_2$, and $73_3$ are the same as those of the SWPFs $71_1$, $71_2$, and $71_3$, respectively. Thus, the more each LWPF is apart from the signal input terminal, the more the edge wavelength thereof increases. The relation between the edge wavelengths and the wavelengths of the multiplexed signal in this embodiment is the same as that in the first embodiment shown in FIG. 1.

According to the third embodiment, the first stage SWPF $71_1$ of the first filtering circuit 71 extracts the optical output $14_1$ with a wavelength $\lambda 1$ which is the shortest wavelength component in the optical input 11. The reflected ray of the first stage SWPF $71_1$ is reflected by the reflection plate $72_1$. Thereafter, this reflected ray enters the second stage SWPF $71_2$. The second stage SWPF $71_2$ transmits the components with the wavelengths $\lambda 1$ and $\lambda 2$. The transmitted ray enters the LWPF $73_1$ disposed behind the SWPF $71_2$. The SWPF $73_1$ removes noises from the entered ray and extracts the optical output $14_2$ with the wavelength $\lambda 2$. Likewise, the SWPF $71_3$ and LWPF $73_2$ extract the optical output $14_3$ with the wavelength $\lambda 3$. The LWPF $73_3$ extracts the optical output $14_4$ with the wavelength $\lambda 4$ from the reflected ray of the SWPF $71_3$.

As with the above-described embodiments, in the third embodiment, a wavelength-division switching apparatus which is compactly constructed and which extracts optical outputs with high S/N ratios can be accomplished.

FIG. 12 also shows levels of optical signals in individual portions of the apparatus in consideration of slight attenuation of light intensity (t) caused by filtering. In this embodiment, unlike with the embodiments shown in FIGS. 1 and 9, disregard of an increase of the number of wavelengths multiplexed, the number of filters that any optical signal passes through does not exceed two until the corresponding optical output is extracted. Thus, even if the number of wavelengths which were multiplexed is large, the levels of optical outputs never largely drops.

Figure 15:
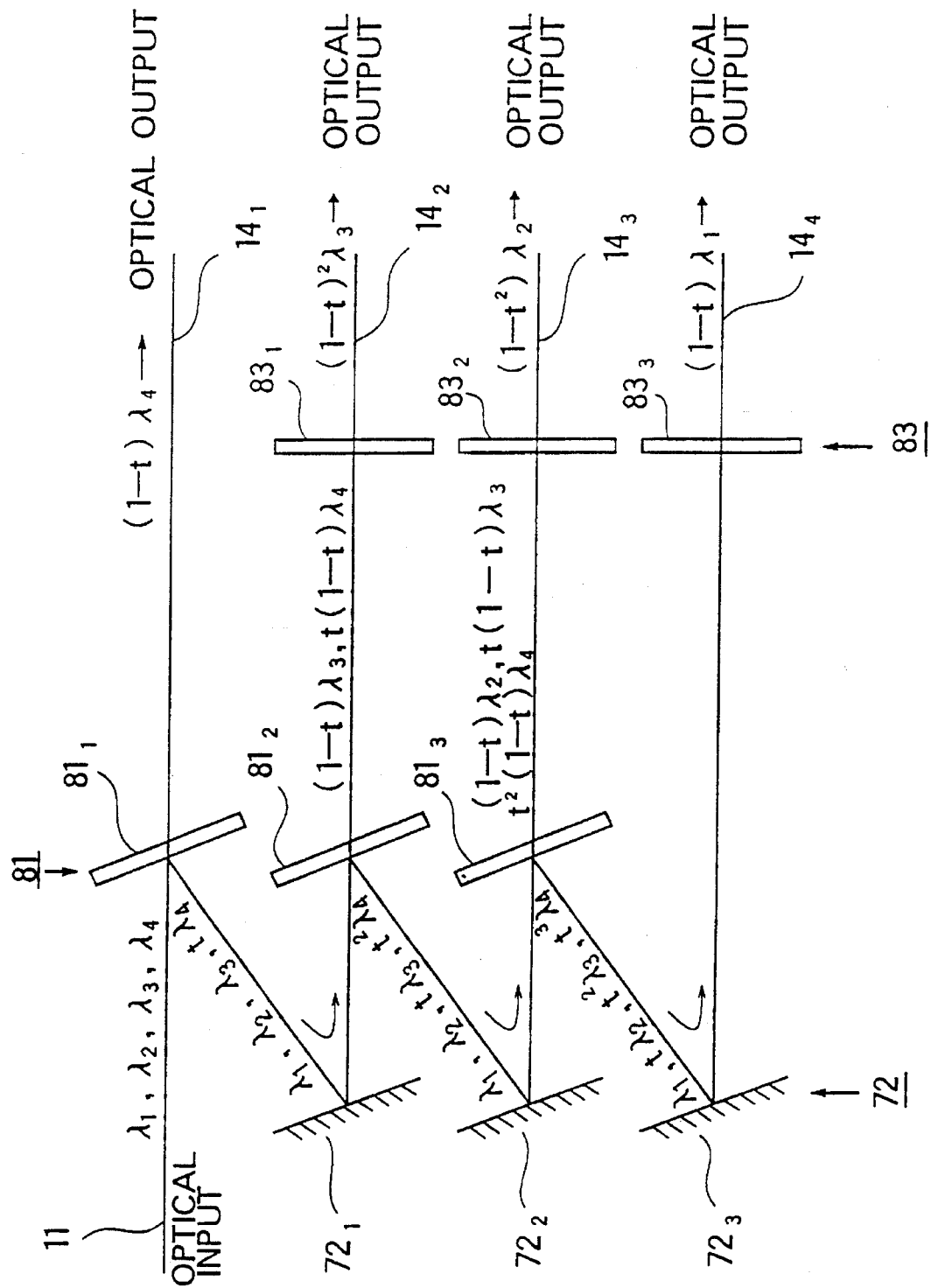
FIG. 15 is a schematic diagram showing the construction of an optical switching apparatus according to a fourth embodiment of the present invention.

FIG. 15 is a schematic diagram showing the construction of an optical switching apparatus according to a fourth embodiment of the present invention. The fourth embodiment is a modification of the third embodiment shown in FIG. 12. In the fourth embodiment, a first filtering circuit 81 is constructed of three LWPFs $81_1$, $81_2$, and $81_3$. In addition, a second filtering circuit 83 is constructed of three SWPFs $83_1$, $83_2$, and $83_3$. The edge wavelengths of the LWPFs $81_1$, $81_2$, and $81_3$ are set to $\lambda c3$, $\lambda c2$, and $\lambda c1$, respectively (where $\lambda c3 > \lambda c2 > \lambda c1$). Likewise, the edge wavelengths of the SWPFs $83_1$, $83_2$, and $83_3$ are set to $\lambda c3$, $\lambda c2$, and $\lambda c1$, respectively.

In other words, according to the third embodiment shown in FIG. 12, the first filtering circuit 71 which was constructed of the plurality of SWPFs successively divides an optical signal in shorter-to-longer wavelength order. In contrast, according to the fourth embodiment shown in FIG. 15, a first filtering circuit 81 which is constructed of a plurality of LWPFs successively divides an optical signal in longer-to-shorter wavelength order. This relation is the same as that between the respective embodiments shown in FIGS. 1 and 9.

Figure 16:
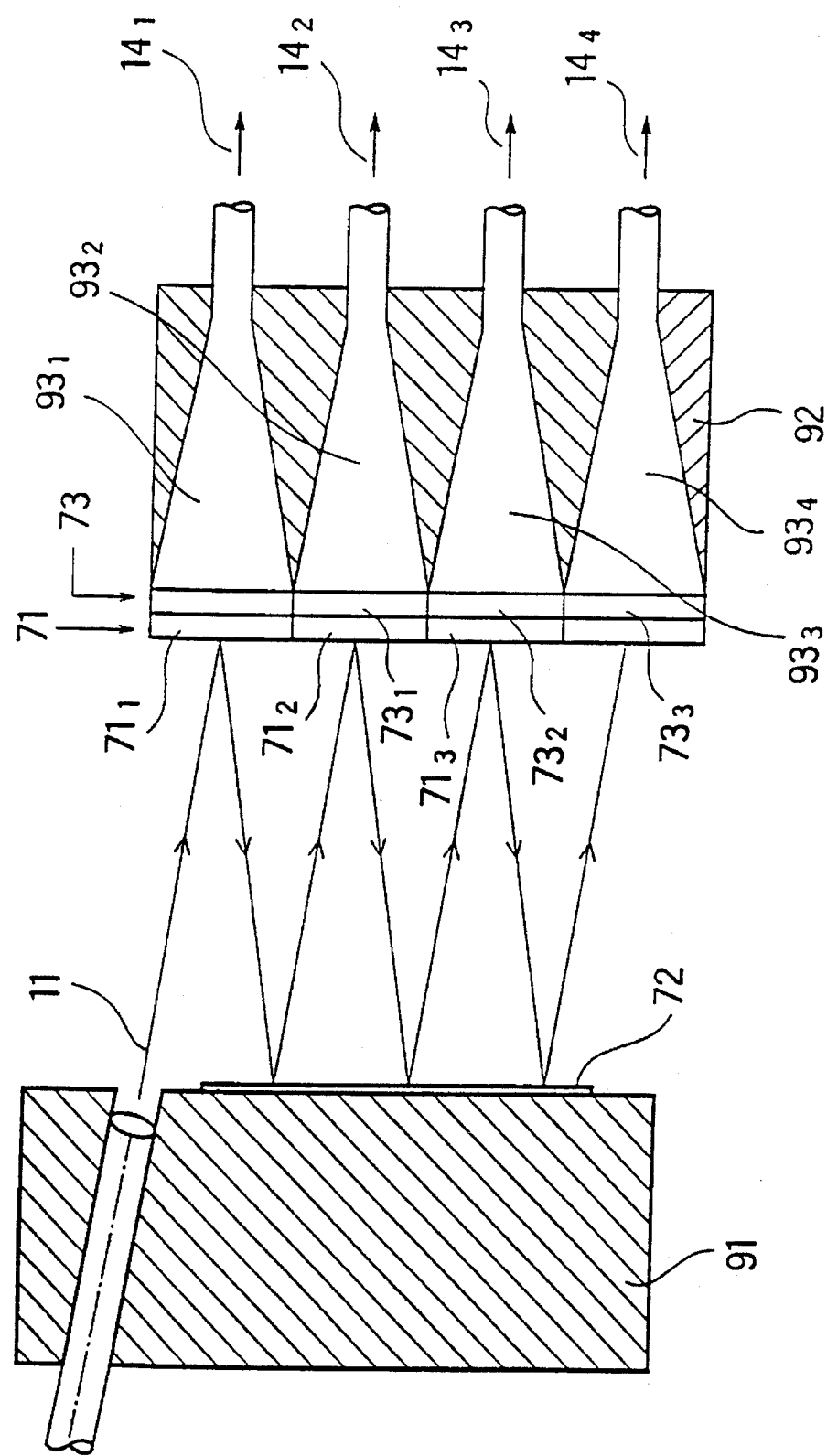
FIG. 16 is a schematic diagram showing the construction of an optical switching apparatus according to a fifth embodiment of the present invention.

FIG. 16 is a schematic diagram showing the construction of an optical switching apparatus according to a fifth embodiment of the present invention. The fifth embodiment is a modification of the third embodiment shown in FIG. 12. In the fifth embodiment, two blocks 91 and 92 are oppositely disposed with a predetermined length. On the opposed surface of a first block 91, a reflection plate 72 is formed. On the opposed surface of a second block 92, a first filtering circuit 71 and a second filtering circuit 73 are layered. Thus, the reflection plate 72 faces the first filtering circuit 71. The first filtering circuit 71 is constructed of a plurality of SWPFs $71_1$, $71_2$, and so force. The second filtering circuit 73 is constructed of a plurality of LWPFs $73_1$, $73_2$, and so force. Thus, the basic construction of the fifth embodiment is, on the whole, the same as that of the third embodiment shown in FIG. 12.

At an upper portion of the first block 91, an input fiber is disposed with an angle to the lateral direction of the first block 91. Thus, the optical input 11 is entered to the opposed surface of the second block 92 with the corresponding angle. As a result, the optical input 11 is reflected repeatedly in a zig-zag pattern between the opposed surfaces of the first and second blocks 91 and 92. Behind the filtering circuits 71 and 73 of the second block 92, horn-shaped wave guides 93 are disposed. Rays which pass through the filtering circuits 71 and 73 in succession are extracted as optical outputs 14 through the horn-shaped wave guides 93. The wavelength-dividing operations of the fifth embodiment are the same as those of the fourth embodiment shown in FIG. 15.

As described above, in the fifth embodiment shown in FIG. 16, the first and second filtering circuits 71 and 73 and the reflection plate 72 are disposed on respective planes which are in parallel with each other. Thus, the apparatus according to this embodiment can be produced more simply than the apparatus where a filtering circuit is inclined as in the construction shown in FIG. 15. In the fifth embodiment, the first and second filtering circuits 71 and 73 are layered. Thus, the construction of the fifth embodiment is more compact than the fourth embodiment shown in FIG. 15.

Figure 17:
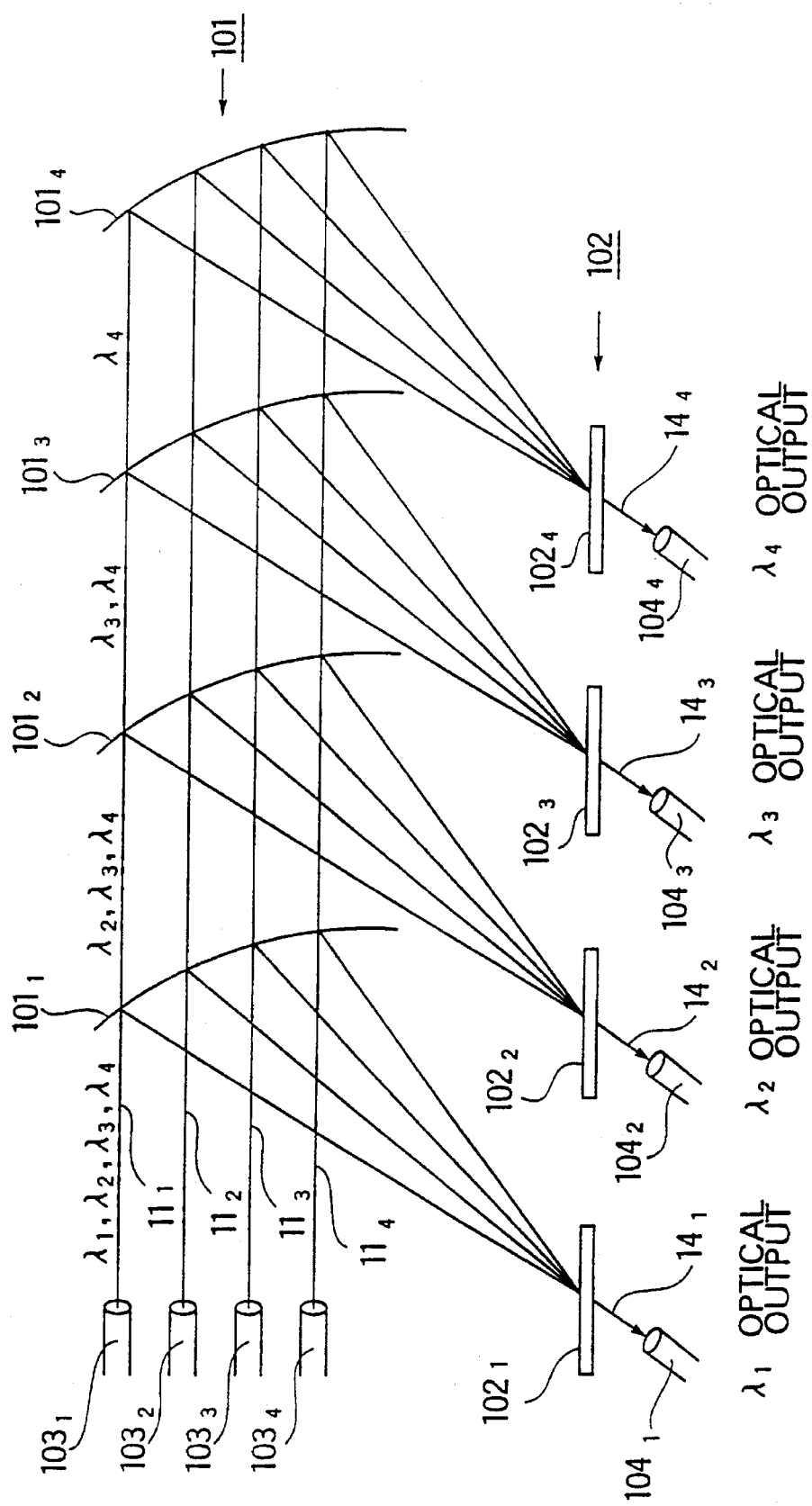
FIG. 17 is a schematic diagram showing the construction of an optical switching apparatus according to a sixth embodiment of the present invention.

FIG. 17 is a schematic diagram showing the construction of an optical switching apparatus according to a sixth embodiment of the present invention. The sixth embodiment is a three-dimensionally extended modification of the first embodiment shown in FIG. 1. In the sixth embodiment, four input rays $11_1$ to $11_4$ which were wavelength-multiplexed are entered from four input fibers $103_1$ through $103_4$ to a switching apparatus. Since an optical beam irradiated from each fiber 103 has a spread angle, each fiber 103 has a collimator lens (not shown). The collimator lens is disposed at an output edge of each fiber 103. Thus, each fiber 103 emits parallel rays.

To divide each input ray 11 into components with different wavelengths, a first filtering circuit 101 and a second filtering circuit 102 are disposed.

The first filtering circuit 101 is constructed of four LWPFs $101_1$ to $101_4$. As with the first embodiment, the more the LWPFs $101_1$ to $101_4$ are apart from an input terminal, the more the edge wavelengths thereof increase. The LWPFs $101_1$ to $101_4$ each have a curved surface with a predetermined curvature so as to reflect components with predetermined wavelengths of four parallel optical inputs and focus them on one point. In producing such LWPFs, the process for forming dielectric films on curved surfaces is not easy. To simplify this process, at first, four independent LWPFs corresponding to four optical inputs are produced. Next, these LWPFs are held on a frame or the like so that reflected rays of the LWPFs are focused on one point. Thus, the LWPFs can be substantially integrated.

The second filtering circuit 102 is constructed of SWPFs $102_1$ to $102_4$ which are disposed at positions where reflected rays of the corresponding LWPFs of the first filtering circuit 101 are focused on. As with the first embodiment shown in FIG. 1, the more the SWPFs $102_1$ to $102_4$ are apart from the input terminal, the more the edge wavelengths thereof increase. In addition, as with the first embodiment shown in FIG. 1, the edge wavelengths of the LWPFs $101_1$, $101_2$, $101_3$, and $101_4$ are the same as those of the SWPFs $102_1$, $102_2$, $102_3$, and $102_4$, respectively.

Optical outputs $14_1$ to $14_4$ which pass through the SWPFs of the second filtering circuit 102 enter fibers $104_1$ to $104_4$, respectively. To cause the optical outputs $14_1$ to $14_4$ of the second filtering circuit 102 to enter the corresponding optical fibers $104_1$ to $104_4$, coupling lenses or the like (not shown) are used.

FIG. 17 also shows components with wavelengths $\lambda 1$ to $\lambda 4$ divided from the optical input $11_1$. A component with the shortest wavelength $\lambda 1$ of the optical input $11_1$ is almost totally reflected by the first stage LWPF $101_1$. The reflected ray passes through the SWPF $102_1$. Thus, the optical output $14_1$ with the wavelength $\lambda 1$ is extracted. Components with longer wavelengths which are partially reflected by the LWPF $101_1$ are removed by the SWPF $102_1$ as noises. Thus, the SWPF $102_1$ extracts only a signal with the wavelength $\lambda 1$. The second stage LWPF $101_2$ and SWPF $102_2$ only extract a signal with the wavelength $\lambda 2$. Likewise, the third and fourth stages LWPFs $101_3$ and $101_4$ and SWPFs $102_3$ and $102_4$ extract only signals with the wavelengths $\lambda 3$ and $\lambda 4$, respectively.

In the above-described example, one fiber $103_1$ transmits a signal where components with four wavelengths were multiplexed. However, in the case that the fiber $103_1$ transmits a signal where components with wavelengths $\lambda 1$ and $\lambda 2$ were multiplexed and the fiber $103_2$ transmits a signal where components with wavelengths $\lambda 3$ and $\lambda 4$ were multiplexed, the components with the four wavelengths are divided into four output fibers $104_1$ to $104_4$. In other words, unless a component with the same wavelength is designated to a plurality of fibers $103_1$ to $103_4$ which transmit optical inputs, optical signals with predetermined wavelengths are divided into the output fibers $104_1$ to $104_4$.

Figure 18:
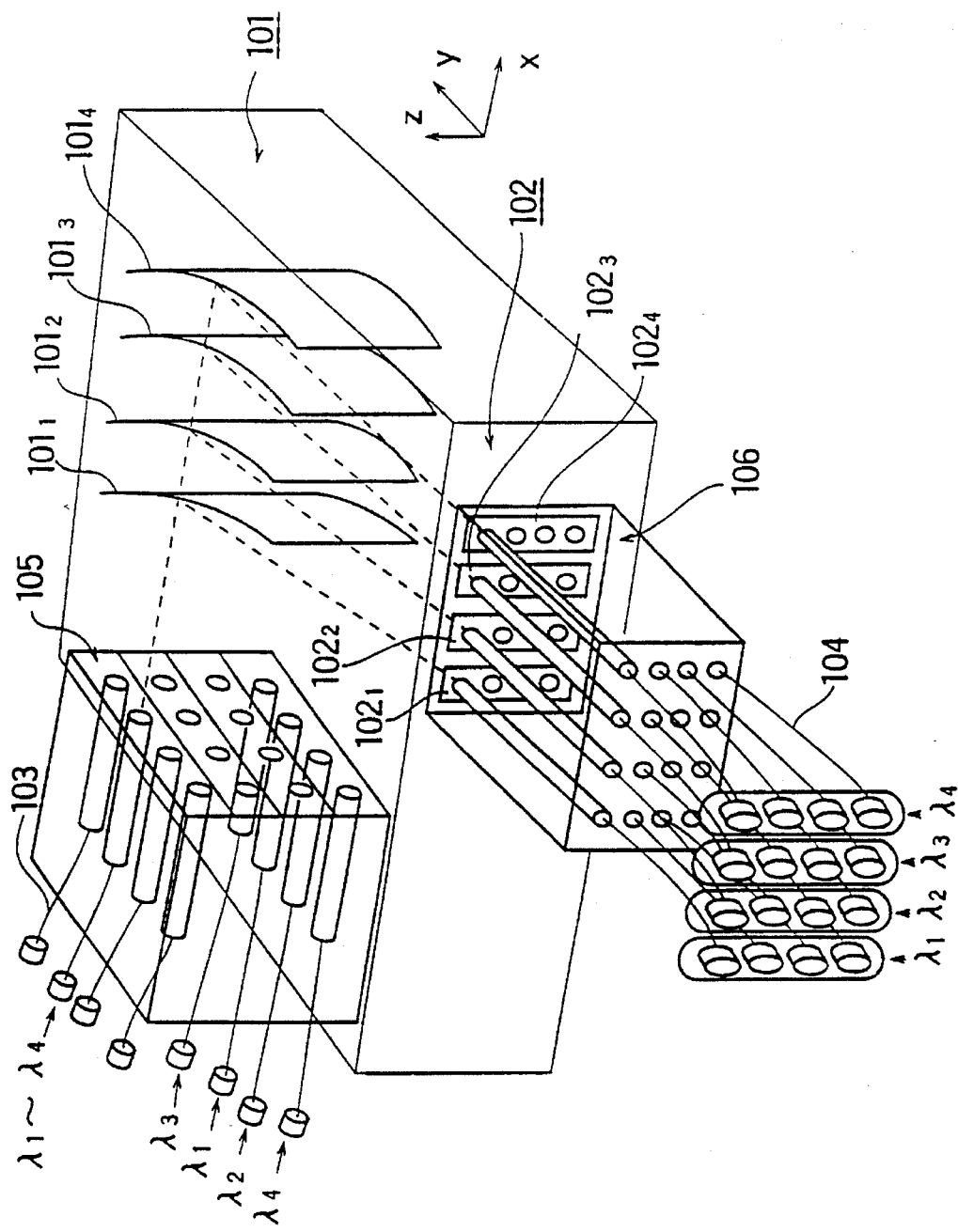
FIG. 18 is a schematic diagram showing the construction of an optical switching apparatus according to a seventh embodiment of the present invention.

FIG. 18 is a schematic diagram showing an optical switching apparatus according to a seventh embodiment of the present invention. The seventh embodiment is a modification of the sixth embodiment shown in FIG. 17. In the seventh embodiment, the apparatus has a three-dimensional construction. For the sake of simplicity, in this embodiment, the portions according to FIG. 17 are denoted by the same reference numerals thereof. In the seventh embodiment, a first filtering circuit 101 shown in FIG. 18 has a thickness n times larger than the thickness of the first filtering circuit 101 shown in FIG. 17 (where n is any integer). Alternatively, the first filtering circuit 101 shown in FIG. 18 is constructed of a plurality of the first filtering circuits 101 shown in FIG. 17 and disposed vertically.

Likewise, a second filtering circuit 102 shown in FIG. 18 has a thickness n times larger than the thickness of the second filtering circuit 102 shown in FIG. 17 (where n is any integer). Alternatively, the second filtering circuit 102 shown in FIG. 18 is constructed of a plurality of the second filtering circuits 102 shown in FIG. 17 and disposed vertically.

In this example, a light emitting portion 105 which emits rays to the first filtering circuit 101 of the switching apparatus has 16 light emitting faces on plane y-z of the coordinate system shown in FIG. 18. Thus, 16 input fibers 103 are connected to the light emitting portion 105. Likewise, a light receiving portion which receives optical outputs of the second filtering circuit 102 has 16 light receiving faces on plane x-z or a plane where the plane x-z is rotated by a predetermined angle around the axis z. The 16 light receiving faces are connected to corresponding 16 output fibers 104.

In the seventh embodiment, between each input fiber 103 and the light emitting portion 105, a collimator lens (not shown) which collimates an optical input is disposed. In addition, at the light receiving face of each output fiber 104, a light condenser lens (not shown) is disposed.

In this embodiment, now assume that an optical input where components with wavelengths $\lambda 1$ to $\lambda 4$ were multiplexed enters one of four light emitting faces on the highest row of the light emitting portion 105. In this case, as with the sixth embodiment shown in FIG. 17, the components with different wavelengths are divided and distributed to four light receiving faces of the highest row of the light receiving portion 106. The components received by the light receiving faces are extracted from the output fibers 104.

As shown in FIG. 18, when optical signals with wavelengths $\lambda 1$ to $\lambda 4$ enter four light emitting faces on the lowest row of the light emitting portion, these optical signals are arranged in an arbitrary sequence. The arranged signals are rearranged in a predetermined sequence and extracted from the output fibers 104. In other words, optical outputs with the same wavelength are extracted from vertical rows of the output fibers 104, whereas optical outputs with different wavelengths (from shorter-to-longer wavelength order) are extracted from horizontal rows of the output fibers 104.

In the seventh and sixth embodiments shown in FIGS. 18 and 17, the number of filters for use with the respective apparatuses is the same. Thus, according to the seventh embodiment, in a signal system in which a number of optical signals with components with different wavelengths were multiplexed flow in parallel, a wavelength-division device can be compactly constructed. In addition, in this embodiment, components with different wavelengths can be divided without interference of optical signals in their vertical direction.

Figure 19:
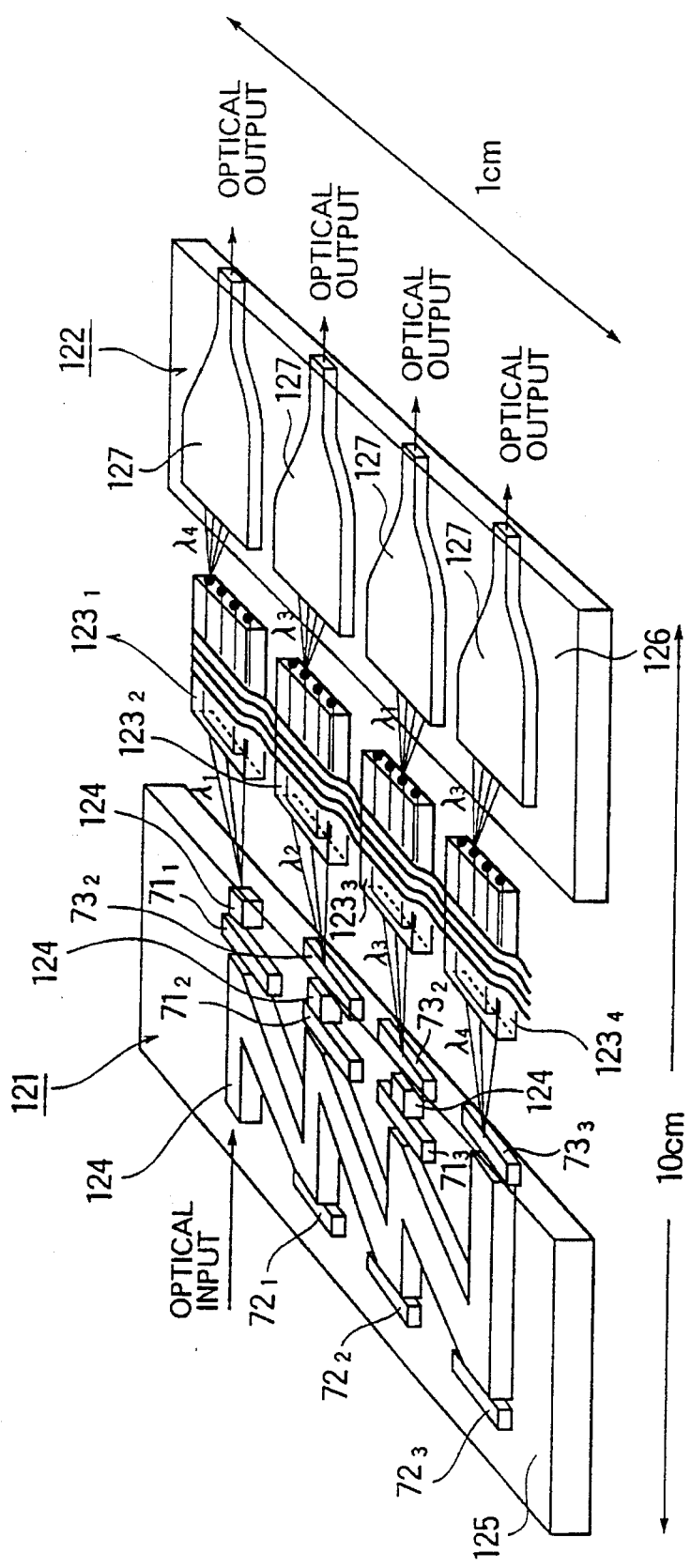
FIG. 19 is a schematic diagram showing the construction of an optical switching apparatus according to an eighth embodiment of the present invention.

FIG. 19 is an optical switching apparatus according to an eighth embodiment of the present invention. In this embodiment, the optical switching apparatus shown in FIG. 12 is integrated with a solid-state wave guide circuit and a semiconductor wavelength-conversion device. A wave guide circuit 121 on an input side accords with the switching apparatus shown in FIG. 12. The wave guide circuit 121 is produced in such a way that a $LiNbO_3$ substrate 125 is Ti-diffused and thereby wave guides 124 are formed. SWPFs $71_1$ to $71_3$ (which construct a first filtering circuit 71), LWPFs $73_1$ to $73_3$ (which construct a second filtering circuit 73), reflection plates $72_1$ to $72_3$ are integrated on the wave guide substrate 125 so that they are mutually connected to edge surfaces of the wave guides 124.

Optical outputs with different wavelengths of the wave guide circuit 121 enter laser diodes $123_1$ to $123_4$ which emit rays with a plurality of wavelengths. Each of the laser diodes 123 is a kind of wavelength-conversion circuit which uses a DFB laser or DBR laser and has wavelength designating electrodes. In this embodiment, each of the laser diodes 123 is provided with a plurality of light emitting portions which emit rays with different wavelengths and a plurality of control electrodes which designate these light emitting portions. In the example shown in the figure, each of the laser diode 123 has four light emitting portions. A light receiving portion of each laser diode 123 is a kind of a photo detector and works as a carrier source. When the laser diode 123 receives an optical signal, carriers are supplied to the light emitting portions of the laser diode 123. Thus, power is supplied to one light emitting portion according to the designated control electrode. Thus, the designated light emitting portion emits laser light. As a result, a required optical output which was wavelength-converted can be obtained.

The optical signal which was wavelength-converted by the laser diode 123 is supplied to a wave guide circuit 122 on an output side. As with the wave guide circuit 121 on the input side, the wave guide circuit 122 is produced in such a way that an $LiNbO_3$ substrate 126 is Ti-diffused and thereby wave guides 127 are formed. Each wave guide 127 is patterned so that its light receiving face is opposed to the plurality of light emitting portions of the laser diode 123. In other words, the light receiving side of each wave guide 127 is widely patterned.

Thus, the optical input where components with different wavelengths were multiplexed is divided into original components. Thereafter, the divided components are wavelength-converted and thereby they are arranged in a predetermined wavelength sequence as optical outputs. As a result, according to this embodiment, a switching apparatus for optical signals which were wavelength-multiplexed can be very compactly constructed.

Figure 20:
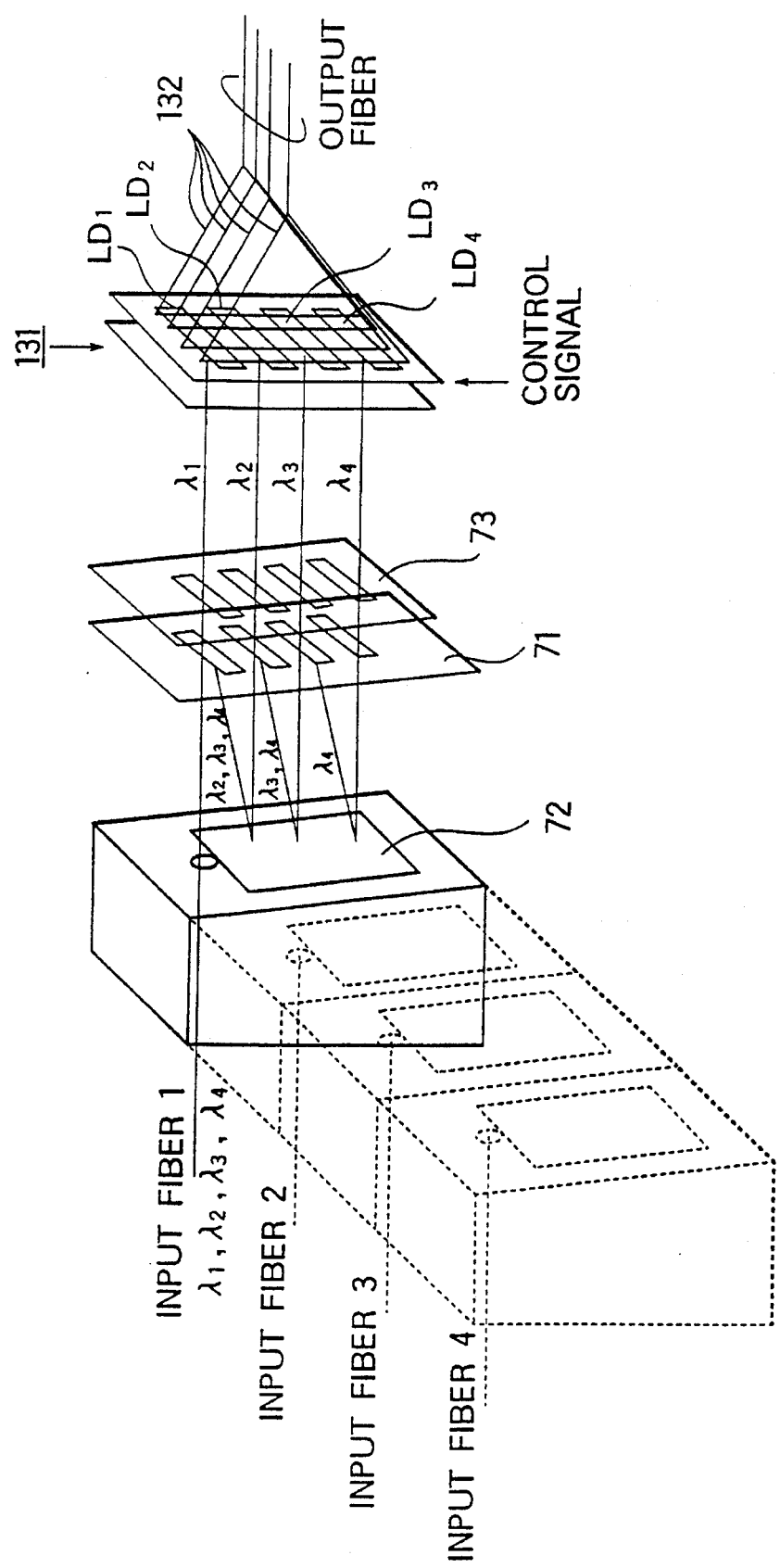
FIG. 20 is a schematic diagram showing the construction of an optical switching apparatus according to a ninth embodiment of the present invention.

FIG. 20 is an optical switching apparatus according to a ninth embodiment of the present invention. This embodiment is a modification of the apparatus according to the third embodiment shown in FIG. 12. In the ninth embodiment, a switch module is three-dimensionally constructed in a free space. Thus, for the sake of simplicity, in this embodiment, the portions according to FIG. 12 are denoted by the same reference numerals thereof. In FIG. 20, a reflection plate 72 is a plane reflection plate disposed on an optical input block to which an input fiber is connected. The reflection plate 72 has a predetermined angle to the optical input. A first filtering circuit 71 which is constructed of a plurality of SWPFs and a second filtering circuit 73 which is constructed of a plurality of LWPFs are opposed on respective transparent substrates or the like.

A portion denoted by a solid line of FIG. 20 is a wavelength-division switching apparatus corresponding to an input fiber 1 through an optical signal which was wavelength-multiplexed is transmitted. The theory of operation of this apparatus is the same as that shown in FIG. 12. As shown by dotted lines of FIG. 20, corresponding to other input fibers 2, 3, and 4 through which respective optical signals which were wavelength-multiplexed are transmitted, the same wavelength-division switching apparatuses are disposed.

Outputs of each wavelength-division switching apparatus enter a wavelength converter 131. As described above, the wavelength converter 131 is provided with laser diodes LD1 to LD4 each of which can emit a ray with one of plural wavelengths corresponding to the divided outputs. In this example, each of the laser diodes LD1 to LD4 can select one of different four wavelengths and emit a corresponding ray. Thus, when the components with different wavelengths enter the wavelength converter 131, one of these components is designated by a control signal. The designated component is converted into an optical signal with a predetermined wavelength necessary for a subsequent switch module.

The output of the wavelength converter 131 is connected to a plurality of two-dimensional beam-combining circuits 132. Each of the two-dimensional beam-combining circuits 132 combines each vertical row of four optical outputs of the laser diodes LD1 to LD4 which are vertically disposed. The two-dimensional beam-combining circuit 132 is constructed of a bundle of four optical fibers, each one end of which is connected to the laser diodes LD1 to LD4, respectively, and the other ends are commonly connected an output fiber. As an alternative spatial construction of the two-dimensional beam-combining circuit 132, the optical outputs of the laser diodes LD1 to LD4 can be focused on to the output fibers by using lenses or diffraction gratings.

The two-dimensional beam combining circuits 132 transmit four optical signals where four wavelengths were multiplexed and converted to four output fibers. It should be noted that this construction is one example of the invention. In other words, generally, the two-dimensional beam-combining circuit 132 transmits n optical signals where n wavelengths were multiplexed to m output fibers (where n and m are any integers).

Thus, the m optical signals with n wavelengths multiplexed are supplied to a subsequent switch module (not shown).

According to this embodiment, a large number of signals which were wavelength-multiplexed can be spatially processed in parallel.

Figure 21:
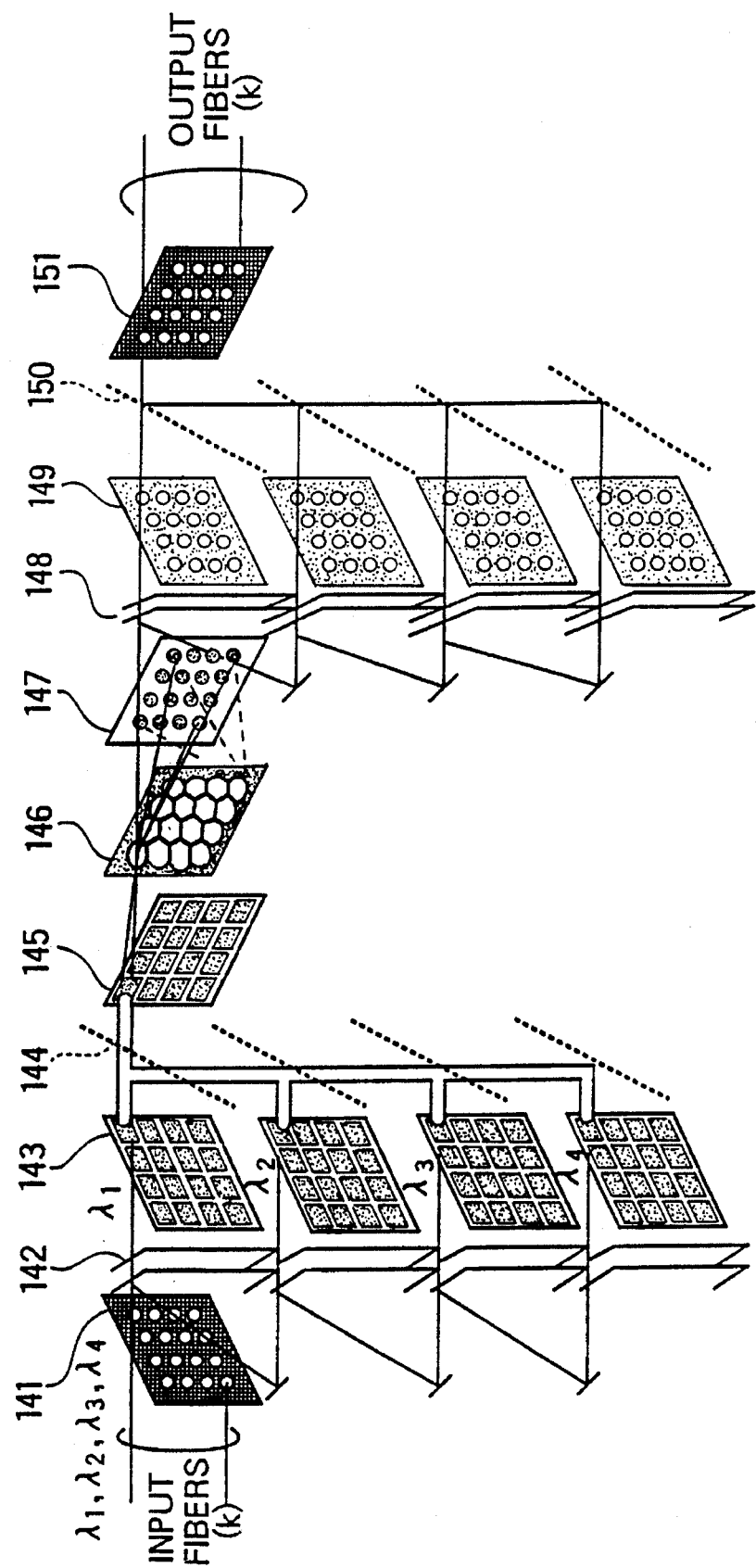
FIG. 21 is a schematic diagram showing the construction of an optical switching apparatus according to a tenth embodiment of the present invention.

FIG. 21 is an optical switching apparatus according to a tenth embodiment of the present invention. This switching apparatus spatially in parallel processes a large number of optical signals which were wavelength-multiplexed and run in parallel. In this switching apparatus, by a combination of processes such as wavelength dividing, wavelength converting, beam combining, and spatial arrangement for k optical inputs with n wavelengths multiplexed, k optical outputs are extracted. In FIG. 21, an example of the apparatus where k=16 and n=4 is shown.

The k input fibers transmit optical inputs with different wavelengths multiplexed to an input plane 141. Each optical input is divided into components with different wavelengths by the corresponding wavelength-division switching apparatus 142. The theory of the construction of the wavelength-division switching apparatus 142 shown in FIG. 21 is the same as that of FIG. 12. The apparatus shown in FIG. 21 is spatially constructed so that it can process k optical signals at a time with corresponding filters and reflection plates. The outputs of each wavelength-division switching apparatus 142 are converted into a desired wavelength by n wavelength converters 143, each of which can process k optical signals at a time. Each wavelength converter 143 may be, for example, of the above-described laser diode circuit.

The optical outputs of the wavelength converters 143 enter half mirrors 144. The half mirrors 144 combine n optical beams on one optical path. The collected optical beams are combined by a beam-combining device 145. Practically, the beam-combining device 145 is, for example, constructed of a bundle of k optical fibers whose number is the same as that of input optical fibers.

FIG. 21 shows the above-described wavelength dividing, wavelength converting, and beam-combining processes for one of optical inputs transmitted from input fibers.

The optical outputs of each beam-combing device 145 are spatially arranged by a jumper device 146. The spatially arranged optical signals are combined to k optical signals by a beam-combining device 147.

The optical outputs of the beam-combining device 147 are wavelength-divided by a wavelength-division switching device 148. The optical output of the wavelength-division switching device 148 are wavelength-converted by a wavelength converter 149. The optical outputs of the wavelength converters 149 are collected with a predetermined combination by half mirrors 150. The collected optical signals are combined on an output plane 151. The constructions of the wavelength-division switching devices 148, the wavelength converters 149, and the half mirrors 150, for example, are the same as those of the wavelength-division switching devices 142, the wavelength converters 143, and the half mirrors 144 on the input side. The optical outputs which were wavelength-multiplexed enter k output fibers connected to the output plane 151.

As described above, the apparatus according to this tenth embodiment can spatially perform parallel processing (including wavelength converting and spatial position switching) for a large number of optical signals which were wavelength-multiplexed and run in parallel three-dimensionally. If the switching apparatus which performs the same processing were accomplished on a two-dimensional plane, a very large area would be required. According to the tenth embodiment, however, the switching apparatus can be installed in a small space.

As was described above, according to the present invention, an optical switching apparatus for wavelength-multiplexing optical communication can be provided, which is compactly constructed of a combination of interference filters, minimizes the decrease of signal levels, and divides wavelength-multiplexed signals into original signals with high S/N ratios.

Additional advantages and modifications will be readily occur to those skilled in the art. Therefore, the invention in its broader aspects is not limited to the specific details, representative devices, and illustrated examples shown and described. Accordingly, departures may be made from such details without departing from the spirit or scope of the general inventive concept as defined by the appended claims and their equivalents.

What is claimed is:

1. An optical switching device for dividing an optical input which was wavelength-multiplexed into a plurality of optical outputs corresponding to components with different wavelengths, comprising:

(a) first filtering means having a plurality of interference filters disposed in line on an optical path of an optical input, said interference filters having different edge wavelengths from each other so as to reflect components with predetermined wavelength regions and to transmit the remaining components; and (b) second filtering means having a plurality of interference filters disposed on respective optical paths of reflected rays of said first filtering means, said interference filters having different edge wavelengths from each other so as to remove components with unnecessary wavelengths from said reflected rays and to extract optical outputs, wherein said interference filters of one of said first and second filtering means comprise long-wavelength pass filters each of which transmits components with wavelengths longer than a predetermined edge wavelength, and said interference filters of the other of said first and second filtering means comprise short-wavelength pass filters each of which transmits components with wavelengths shorter than a predetermined edge wavelength.

2. An optical switching device according to claim 1,
wherein said interference filters of said first filtering means are short-wavelength pass filters which transmit components with wavelengths shorter than a predetermined edge wavelength and have different edge wavelengths which are respectively shorter for filters which are respectively more distant from an optical input terminal, and said interference filters of said second filtering means are long-wavelength pass filters which transmit components with wavelengths longer than a predetermined edge wavelength and have different edge wavelengths which are respectively shorter for filters which are respectively more distant from the optical input terminal.

3. An optical switching device according to claim 2,
wherein each short-wavelength pass filter of said first filtering means has a same edge wavelength as a corresponding long-wavelength pass filter of said second filtering means.

4. An optical switching device according to claim 1,
wherein said interference filters of said first filtering means have respective curved surfaces for focusing reflected rays of respective optical inputs on to one point, said curved surfaces being disposed on optical paths of optical inputs which run in parallel each other.

5. An optical switching device according to claim 1, further comprising:
reflecting means disposed on the optical paths of the reflected rays of said first filtering means for guiding reflected rays of each of said interference filters of said first filter means into a subsequent interference filter thereof, and wherein said interference filters of said second filter means are disposed on respective optical paths of transmitted rays of interference filters of said first filtering means.

6. An optical switching device according to claim 5,
wherein successive interference filters of said first filtering means having successively longer distances from an optical input terminal comprise short-wavelength pass filters having different edge wavelengths of successively longer wavelengths so as to successively transmit predetermined signal components of said optical input one by one, and to reflect remaining signal components to the successive interference filters, and wherein successive interference filters of said second filtering means having successively longer distances from the optical input terminal comprise long-wavelength pass filters having different edge wavelengths of successively shorter wavelength so as to remove noise components in the transmitted rays of said first filter means.

7. An optical switching device according to claim 5,
wherein successive interference filters of said first filtering means having successively longer distances from an optical input terminal comprise long-wavelength pass filters having different edge wavelengths of successively shorter wavelengths so as to successively transmit predetermined signal components of said optical input one by one, and to reflect remaining signal components to the successive interference filters, and wherein successive interference filters of said second filtering means having successively longer distances from the optical input terminal comprise short-wavelength pass filters having different edge wavelengths of successively shorter wavelength so as to remove noise components in the transmitted rays of said first filter means.

8. An optical switching device for dividing an optical input which was wavelength-multiplexed into a plurality of optical outputs corresponding to components with different wavelengths, comprising:

(a) first filtering means having a plurality of interference filters disposed in line on an optical path of an optical input, said interference filters having different edge wavelengths from each other so as to reflect components with predetermined wavelength regions and to transmit the remaining components; and (b) second filtering means having a plurality of interference filters disposed on respective optical paths of reflected rays of said first filtering means, said interference filters having different edge wavelengths from each other so as to remove components with unnecessary wavelengths from said reflected rays and to extract optical outputs, wherein said interference filters of said first filtering means are long-wavelength pass filters which transmit components with wavelengths longer than a predetermined edge wavelength and have different edge wavelengths which are respectively longer for filters which are respectively more distant from an optical input terminal, and said interference filters of said second filtering means are short-wavelength pass filters which transmit components with wavelengths shorter than a predetermined edge wavelength and have different edge wavelengths which are respectively longer for filters which are respectively more distant from the optical input terminal.

9. An optical switching device according to claim 8,
wherein each long-wavelength pass filter of said first filtering means has a same edge wavelength as a corresponding short-wavelength pass filter of said second filtering means.

10. An optical switching device for dividing an optical input which was wavelength-multiplexed into a plurality of optical outputs corresponding to components with different wavelengths, comprising:

(a) first filtering means having a plurality of interference filters disposed in a direction intersecting an optical path of an optical input so that one of said interference filters receives said optical input, said interference filters having different edge wavelengths from each other so as to reflect components with predetermined wavelength regions of said optical input and to transmit remaining components thereof;

(b) reflection means disposed on optical paths of reflected rays of said first filtering means so as to guide a reflected ray of each of said interference filters of said first filtering means to a subsequent interference filter; and (c) second filtering means having a plurality of interference filters disposed on respective optical paths of transmitted rays of said first filtering means, said interference filters having different edge wavelengths from each other so as to remove components with unnecessary wavelengths from the transmitted rays and to extract optical outputs.

11. An optical switching device according to claim 10, wherein said interference filters of said first filtering means are short-wavelength pass filters which transmit components with wavelengths shorter than a predetermined edge wavelength and have different edge wavelengths which are respectively longer for filters which are respectively more distant from an optical input terminal, and said interference filters of said second filtering means are short-wavelength pass filters which transmit components with wavelengths shorter than a predetermined edge wavelength and have different edge wavelengths which are respectively longer for filters which are respectively more distant from the optical input terminal.

12. An optical switching device according to claim 10, wherein said interference filters of said first filtering means are long-wavelength pass filters which transmit components with wavelengths longer than a predetermined edge wavelength and have different edge wavelengths which are respectively shorter for filters which are respectively more distant from an optical input terminal, and said interference filters of said second filtering means are short-wavelength pass filters which transmit components with wavelengths shorter than a predetermined edge wavelength and have different edge wavelengths which are respectively shorter for filters which are respectively more distant from the optical input terminal.

* * * * *